(12) United States Patent
Cairns et al.

(10) Patent No.: US 11,313,739 B2
(45) Date of Patent: Apr. 26, 2022

(54) METHODS AND APPARATUSES FOR TEMPERATURE MEASUREMENT

(71) Applicant: CAIRNS INTELLECTUAL PROPERTY LTD, Brentford (GB)

(72) Inventors: Robin Cairns, Brentford (GB); Michael James Holt, Egham (GB)

(*) Notice: Subject to any disclaimer, the term of this patent is extended or adjusted under 35 U.S.C. 154(b) by 0 days.

(21) Appl. No.: 16/068,691

(22) PCT Filed: Jan. 11, 2017

(86) PCT No.: PCT/GB2017/050061
§ 371 (c)(1),
(2) Date: Jul. 9, 2018

(87) PCT Pub. No.: WO2017/122006
PCT Pub. Date: Jul. 20, 2017

(65) Prior Publication Data
US 2019/0128750 A1 May 2, 2019

(30) Foreign Application Priority Data

Jan. 11, 2016 (GB) .................................... 1600445

(51) Int. Cl.
*G01K 13/06* (2006.01)
*B65G 47/71* (2006.01)
(Continued)

(52) U.S. Cl.
CPC ............. *G01K 13/06* (2013.01); *B65G 47/71* (2013.01); *G01K 1/024* (2013.01); *G01K 1/146* (2013.01);
(Continued)

(58) Field of Classification Search
CPC ...... A22C 17/008; G01K 13/00; G01K 1/146; G01K 2207/06; G01K 13/06; G01K 1/024;
(Continued)

(56) References Cited

U.S. PATENT DOCUMENTS

| 4,086,813 A * | 5/1978 | Meek ....................... G01K 1/08 |
| | | 219/712 |
| 4,728,789 A * | 3/1988 | Broockman ....... G06K 7/10871 |
| | | 235/457 |

(Continued)

FOREIGN PATENT DOCUMENTS

| CA | 2271084 A1 * | 5/1998 | ............. G01N 33/12 |
| KR | 102039443 B1 * | 11/2019 | |

(Continued)

*Primary Examiner* — Gail Kaplan Verbitsky
(74) *Attorney, Agent, or Firm* — Robinson IP Law, PLLC

(57) ABSTRACT

This invention relates to a method and apparatus for automated measurement of the temperatures of samples on a production line without any human intervention. In one aspect the apparatus has a conveyance system; and a temperature measurement unit having: a first member and a second member which are movable relative to each other between at least a first position in which the first and second members cooperate to form an internal space which is substantially internally reflective of radiofrequency radiation and a second position in which the object can be introduced into said internal space; and a radiometer arranged so that it is coupled to said internal space, wherein the conveyance system is arranged to convey the object to a measurement position in said internal space whilst the first and second members are in the second position, for a measurement of the radiation emitted from the object to be performed by the radiometer when the first and second members are in the first position and to convey the object away from said measurement position once the measure- (Continued)

ment has been performed and said first and second members have returned to the second position. The apparatus allows for recording and storing of measured temperature information. Embodiments of the invention provide for auto-calibration of the apparatus and automated testing and rejection of samples which do not meet pre-defined criteria.

11 Claims, 16 Drawing Sheets

(51) Int. Cl.
G01K 1/14 (2021.01)
G01K 1/024 (2021.01)
G01K 11/00 (2006.01)
G01K 15/00 (2006.01)

(52) U.S. Cl.
CPC .......... G01K 11/006 (2013.01); G01K 15/005 (2013.01); *G01K 2207/04* (2013.01); *G01K 2207/06* (2013.01)

(58) Field of Classification Search
CPC .. G01K 15/005; G01K 2207/04; G01N 33/02; G01N 33/12; B65G 47/71
USPC .............................. 374/170, 100, 7, 149, 163
See application file for complete search history.

(56) References Cited

U.S. PATENT DOCUMENTS

| | | | | |
|---|---|---|---|---|
| 6,866,417 B2 * | 3/2005 | Gunawardena | .... | G05D 23/1935 374/121 |
| 8,609,168 B2 * | 12/2013 | Ceravalls Pujol | ....... | G01K 1/14 426/231 |
| 8,783,167 B1 * | 7/2014 | Titel | ........ | G01K 1/026 99/325 |
| 8,931,400 B1 * | 1/2015 | Allen | ...... | G01K 1/024 99/344 |
| 2002/0009121 A1 * | 1/2002 | Siu | ......... | A47J 43/283 374/155 |
| 2004/0022298 A1 * | 2/2004 | Gunawardena | ........ | G01K 13/06 374/141 |
| 2005/0157775 A1 * | 7/2005 | Chapman | ............. | G01K 13/002 374/170 |
| 2013/0216454 A1 * | 8/2013 | Blecka | ............... | G01N 35/0099 422/560 |
| 2014/0220197 A1 * | 8/2014 | Hocker | ................... | B65G 15/00 426/233 |
| 2014/0234496 A1 * | 8/2014 | Siegel | ..................... | F23N 5/242 426/231 |
| 2014/0269815 A1 * | 9/2014 | Sloat | ...................... | G01N 22/02 374/5 |
| 2016/0271822 A1 * | 9/2016 | Burk | ......................... | B26D 5/00 |
| 2017/0296154 A1 * | 10/2017 | Frazier | ................ | A61M 5/1452 |
| 2019/0191746 A1 * | 6/2019 | Gillette | ................... | A23B 7/158 |

FOREIGN PATENT DOCUMENTS

WO       WO-0002043 A1 *   1/2000   ............. A22B 5/007
WO       WO-2018209383 A1 *   11/2018   ............. G01N 33/12

* cited by examiner

Fig. 29a
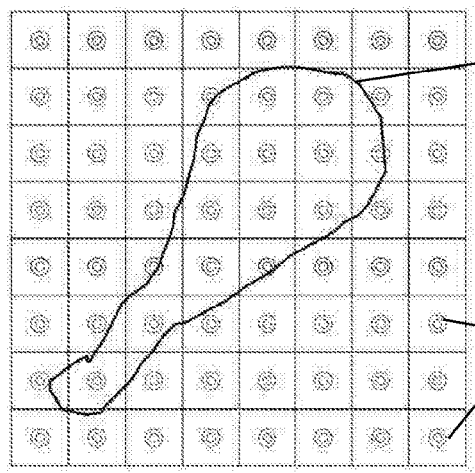
Fig. 29b
Fig. 29c
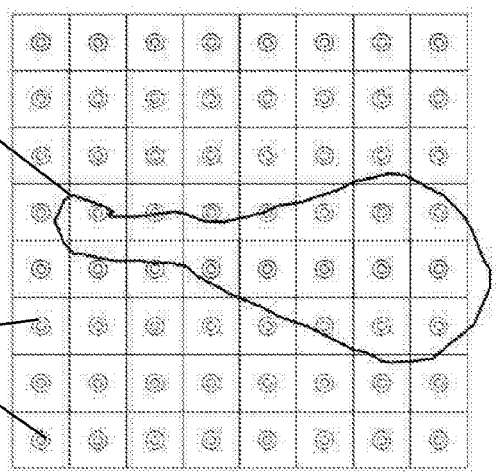
Fig. 29d

METHODS AND APPARATUSES FOR TEMPERATURE MEASUREMENT

FIELD OF THE INVENTION

The present invention relates to methods and apparatuses for temperature measurement. It is particularly, but not exclusively, related to methods and apparatuses which measure the temperature of products in a production line setting.

BACKGROUND OF THE INVENTION

Food production companies constantly need to improve productivity and reduce waste and labour/staff. They also need to take care to monitor temperatures throughout their production processes and at critical control points ("CCP"). This includes the temperatures of packaged foods that need be measured before storage or despatch.

At present, the most common technique is invasive probing by thermocouple, thermistor, or resistive temperature detectors (RTDs). These methods require a skilled operator with a probe that can pierce or break into/through the packaging. It is then necessary to wait for the probe to stabilise with the core temperature of the product, which can take typically from three to five minutes depending upon the product being tested. The displayed temperature is then recorded by writing it down. This important measurement can vary considerably from operator to operator which can lead to varying results from the same product tested by different operators. There also no record or proof of the actual value from the instrument used that is written down by the operator.

Products tested in this manner must be discarded after probing. Such a technique is therefore necessarily a sampling technique where the chosen samples are wasted. The temperature measured by probing therefore also only applies to a small volume of material around the probe, and the probing is subject to significant operator-dependent variability. In the case of frozen products it is very difficult, and in some cases not possible, to safely and accurately penetrate and measure the product.

Infra-red temperature sensors are occasionally used and are non-invasive. However, the results from such sensors are not particularly reliable as they require the sensor to be pointed at a clean and non-shiny area. This then only penetrates a few microns below the surface and gives variable results, particularly for packaged frozen products where the outer temperature of the packaging is unlikely to be representative of the temperature of the product itself.

Therefore, the food industry in particular, requires a non-invasive, non-destructive temperature measuring technique for process monitoring, product safety and quality control. Typical requirements are to check that a food product has been cooked, or at least partly cooked, to a specified minimum temperature, or cooled to below a specified temperature, e.g., for storage or distribution.

However, these problems are not limited to the food industry and there is a general desire in many sectors for automated temperature measurement apparatuses and methods, particularly those which can operate in a production line setting without interrupting the flow of the production line.

U.S. Pat. No. 6,964,514 describes an apparatus for measuring the temperature of an object such as a food object. The apparatus includes a coupling device for coupling radiation emanating from the objection to a radiation temperature measuring radiometer and a device for switching measurement circuitry between measuring the radiation temperature of a first reference temperature and the radiation temperature of the object. The apparatus make use of microwave radiometry to measure the temperature of the object.

Microwave radiometric temperature measurements are inherently non-invasive and non-destructive. This provides significant advantages in relation to the measurement of samples from a production line.

U.S. Pat. No. 7,059,765 describes an apparatus for measuring the temperature of an object using an electromagnetic antenna cavity operating in a combination of induction field and travelling wave modes or standing-wave modes.

Although U.S. Pat. Nos. 6,964,514 and 7,059,765 both mention the possibility of using the apparatus disclosed therein in a production line, no further detail of such an implementation is discussed. The present inventors have attempted such an implementation and discovered that there are numerous problems, such that simply implementing the apparatus described in that document in a production line is not possible. Without limitation, these problems include the ability to form a completely sealed cavity in a production line setting to ensure coupling of the radiation from the sample to the radiometer. As the radiation levels being measured and on which the temperature calculation is performed are very small, typically in the range of picowatts ($10^{-12}$ W), even minor imperfections in the sealing of the cavity can significantly affect the accuracy of the resultant temperature readings.

The present invention aims to provide methods and apparatuses which permit the automated and preferably non-invasive measurement of the temperature of products in an inline fashion in a production line setting.

A further preferred object of the present invention is to provide a method and apparatus which reduces or removes the need for human intervention in the measurement process and can store and record temperatures electronically.

A further preferred object of the present invention is to provide a method and apparatus that can automatically remove products that do not meet certain temperature criteria from the production line.

A further object of the present invention is to provide a method and apparatus for inline temperature measurement which can be auto-calibrated.

SUMMARY OF THE INVENTION

At their broadest, aspects of the present invention provide methods and apparatuses for measuring the temperature of an object in which the object is conveyed to a measurement position and the measurement process carried out automatically.

In particular aspects of the present invention, methods and apparatuses are provided in which a sealed cavity is formed around the object at the measurement position for radiometric measurement to be carried out.

A first aspect of the present invention provides an apparatus for measuring the temperature of an object, the apparatus including: a conveyance system; and a temperature measurement unit having: a first member and a second member which are movable relative to each other between at least a first position in which the first and second members cooperate to form an internal space which is substantially internally reflective of radiofrequency radiation and a second position in which the object can be introduced into said internal space; and a radiometer arranged so that it is coupled to said internal space; wherein the conveyance system is arranged to convey the object to a measurement position in said internal space whilst the first and second members are in the second position, for a measurement of the radiation emitted from the object to be performed by the radiometer when the first and second members are in the first position and to convey the object away from said measurement position once the measurement has been performed and said first and second members have returned to the second position.

In some embodiments, the first member is a container with an opening in one wall and the second member is a plate which is arranged to completely cover that opening.

In certain embodiments there are a plurality of said plates which are joined to form a continuous loop and form part of the conveyance system. This enables the second members to form part of the conveyance system and removes the requirement for the object to be moved onto a separate support for the measurement to take place. The plates can be pivoted relative to each other to permit the forming of the loop. The pivots may be about an axis substantially perpendicular to the direction of travel but in the same plane as the direction of conveyance to form a caterpillar-type track combination which rotates around driven rollers in a substantially vertical loop. Alternatively the pivots may be about an axis substantially perpendicular to the plane of the conveyance of the objects to form a scale-type track which rotates in a substantially horizontal loop.

In other embodiments, the measurement unit is configured to move with the conveyance system whilst in the first position so that the movement of objects on the conveyance system is not interrupted. The measurement unit can then return to a position earlier on the conveyance system to carry out the next measurement.

In other embodiments the plate is attached to one end of an arm, the arm being pivotable about an axis passing through a point distant from the plate so that the plate can be moved between a plurality of positions, at least one of those positions being the measurement position. This configuration requires only a single plate and the object can be loaded onto the plate in one position, rotated to the measurement position, and then rotated to a further position where it is offloaded back onto the conveyance system.

In such embodiments, there may be a plurality of said plates, each attached to an arm, the arms all being pivotable about the same point. For example, there may be three plates, thus permitting one object to be loaded on to a plate in one position whilst another object is being measured and a further object is being unloaded. The arms may be fixed relative to each other, or may be independently controlled.

In a development of these embodiments, the arm may also pivot about a second axis to change the orientation of the plate and cause an object on the plate to slide off under the action of gravity. This allows an easy process for unloading the plates as mechanical force is not required.

The apparatus may further include at least one separator which is substantially transparent to radiofrequency radiation, wherein the object rests on the separator at least when it is in the measurement position. The separator can separate the object from the plate or other part of the measurement unit when the measurement is being conducted. This can improve the coupling of the radiation from the object to the radiometer.

The separator may be recessed into the plate such that the upper surfaces of the plate and the separator are substantially level. This configuration can make the loading and unloading of the objects onto and off the separator easier as there is no level difference between separator and the surrounding plate and so the objects can be pushed or slid onto and off the separator.

In other embodiments, the first member is a container with an opening in one wall and the second member is a door attached to the first member which is arranged to seal that opening.

Preferably, in such embodiments, the conveyance system includes a section located within the internal space which supports the object in the measurement position during the measurement and is separate from the other parts of the conveyance system to allow the door to close. This allows the object to be conveyed until it is wholly within the internal space and supported there whilst the door closes to seal the internal space. After the measurement, the object can then be conveyed out of the internal space by the section and the remainder of the conveyance system.

Preferably the section of the conveyance system is substantially transparent to radiofrequency radiation and therefore does not impact on the measurement of the radiation emanating from the object.

In certain arrangements, the temperature measurement unit further includes a second door. The object can then enter the internal space via the first door and exit via the second. This enables the temperature measurement unit to effectively be positioned along a continuous conveyance system, so that objects can enter, be measured and move on as a further object is introduced into the unit. This improves the efficiency of the measurement and also means that all parts of the conveyance system surrounding the unit need only operate in a single direction.

Preferably the measurement unit further includes a seal between the first and second members, the seal forming a substantially complete barrier to radiofrequency radiation when the first and second members are in the first position.

In certain embodiments the seal is a compressible gasket. Preferably in such embodiments, the first and second members are brought together and a positive overpressure is applied to maintain them together. This pressure compresses the gasket to ensure a complete seal around the full perimeter of the connection between the members.

In other embodiments the seal may be a labyrinthine seal comprising a plurality of first projections on the first member and a plurality of second projections on the second member such that the first and second projections intermesh in the first position. With this seal, even if there is not complete matching between the first and second projections, the path from the interior of the cavity to the exterior is so long and tortuous that no radiation escapes.

In certain embodiments the conveyance system further includes a main conveyance; a sample conveyance and a first selection mechanism for selecting objects on the main conveyance and moving them to the sample conveyance and wherein the sample conveyance conveys the selected objects to the measurement position. This configuration allows the sampling of products from a larger production line so that the speed of the production line is not affected by the measurement process.

Preferably the apparatus further includes a controller, wherein the controller is arranged to receive a measurement of the radiation from an object from the radiometer and calculate the temperature of the object from that measurement.

The conveyance system may further include a second selection mechanism, wherein the controller is further arranged to compare the calculated temperature of the object against a predetermined criterion and control the second selection mechanism to remove an object from the conveyance system if its calculated temperature does not meet the criterion.

The conveyance system may further include a main conveyance; a sample conveyance and a first selection mechanism for selecting objects on the main conveyance and moving them to the sample conveyance and wherein the sample conveyance conveys the selected objects to the measurement position and returns the object to the main conveyance if the calculated temperature of the object meets the criterion.

Thus the controller can select objects from the main conveyance for measurement. This selection can be periodic (e.g. every tenth object or similar), or may be random. The selection could also be driven by further testing of the objects before they reach the first selection mechanism, which might identify objects which are thought not to meet the criterion for other reasons.

The controller can then test the selected objects and either reject them by removing them from the conveyance system, or returning them to the main conveyance.

In the case where the measurement unit forms part of the main conveyance, the controller may just control a reject mechanism which removes objects which do not meet the criterion.

The apparatus may further include an agitator positioned on the conveyance prior to the temperature measurement unit. The agitator may be arranged to agitate the objects prior to them being conveyed to the measurement position. For containers having liquid contents, this agitation can help to ensure that the temperature of the object as a whole is uniform. The agitator may be, for example, a table or other support onto which the object can be placed and which is then vibrated.

In certain embodiments, the apparatus further includes a temperature probe and a reference sample, wherein: the conveyance system is arranged to convey the reference sample to a second measurement position where its temperature is measured by the temperature probe, and to subsequently convey the reference sample to the measurement position where a measurement of the radiation emitted from the object is performed by the radiometer, and the controller is arranged to calibrate the calculations of temperature of objects based on the temperature of the reference sample measured by the temperature probe and the radiation detected from the reference sample by the radiometer.

In this way, the apparatus can be auto-calibrating by checking the accuracy of the calculations being made by the controller based on the temperature calculated for the reference sample whose temperature has been measured independently prior to the measurement by the radiometer.

Preferably the apparatus is arranged to measure the temperature and radiation emission of the reference sample on a repeated basis to maintain the calibration of the calculations.

The apparatus of the present aspect may include any combination of some, all or none of the above described preferred and optional features.

The apparatus of the present aspect may operate by carrying out a method according to the second aspect of this invention described below, but need not do so.

A second aspect of the present invention provides a method of measuring the temperature of an object on a conveyance system, the method including the steps of: locating the object on the conveyance system; conveying the object to a measurement position using the conveyance system; forming, around the object, a cavity which is substantially internally reflective of radiofrequency radiation; measuring the radiation emitted from the object; determining the temperature of the object from the measured radiation; and conveying the object from the measurement position using the conveyance system.

In some embodiments, the cavity is formed by bringing together a container with an opening in one wall and a plate which is arranged to completely cover that opening.

In certain embodiments there are a plurality of said plates which are joined to form a continuous loop and form part of the conveyance system. This enables the plates to form part of the conveyance system and removes the requirement for the object to be moved onto a separate support for the measurement to take place. The plates can be pivoted relative to each other to permit the forming of the loop. The pivots may be about an axis substantially perpendicular to the direction of travel but in the same plane as the direction of conveyance to form a caterpillar-type track combination which rotates around driven rollers in a substantially vertical loop. Alternatively the pivots may be about an axis substantially perpendicular to the plane of the conveyance of the objects to form a scale-type track which rotates in a substantially horizontal loop.

In other embodiments, the measuring step is performed by moving the cavity with the conveyance system so that the movement of objects on the conveyance system is not interrupted. The components forming the cavity can then return to a position earlier on the conveyance system to carry out the next measurement.

In other embodiments the plate is attached to one end of an arm and the step of conveying the object to the measurement position includes rotating said arm and said plate. This configuration requires only a single plate and the object can be loaded onto the plate in one position, rotated to the measurement position, and then rotated to a further position where it is offloaded back onto the conveyance system.

In such embodiments there may be a plurality of said plates, each attached to an arm, such that the steps of conveying, forming, measuring and conveying can be performed simultaneously for a plurality of objects. For example, there may be three plates, thus permitting one object to be loaded on to a plate in one position whilst another object is being measured and a further object is being unloaded. The arms may be fixed relative to each other, or may be independently controlled.

In a development of these embodiments, the method may further include the step of sliding the object off the plate by tilting the plate. This allows an easy process for unloading the plates as mechanical force is not required.

The step of locating the object on the plate may locate the object on a separator which is substantially transparent to radiofrequency radiation. The separator can separate the object from the plate or other part of the measurement unit when the measurement is being conducted. This can improve the coupling of the radiation from the object to the radiometer.

In other embodiments the cavity is formed by closing a door to seal an opening in one wall of a container.

Preferably, in such embodiments, the step of conveying the object to the measurement position includes transferring the object to a section of the conveyance system which is located within the internal space and is separate from the other parts of the conveyance system to allow the door to close. This allows the object to be conveyed until it is wholly within the internal space and supported there whilst the door closes to seal the internal space. After the measurement, the object can then be conveyed out of the internal space by the section and the remainder of the conveyance system.

Preferably the section of the conveyance system is substantially transparent to radiofrequency radiation and therefore does not impact on the measurement of the radiation emanating from the object.

In certain arrangements, there is a further door which seals a further opening in the container and the step of conveying the object from the measurement position includes passing the object through the further door. The object can then enter the internal space via the first door and exit via the second. This enables the temperature measurement unit to effectively be positioned along a continuous conveyance system, so that objects can enter, be measured and move on as a further object is introduced into the unit. This improves the efficiency of the measurement and also means that all parts of the conveyance system surrounding the unit need only operate in a single direction.

In certain embodiments the method further includes the step of comparing the determined temperature of the object against a predetermined criterion and removing an object from the conveyance system if its determined temperature does not meet the criterion.

The conveyance system may further include a main conveyance; a sample conveyance and the method may further include the step of selecting objects on the main conveyance and moving them to the sample conveyance and wherein the sample conveyance conveys the selected objects to the measurement position. This allows the sampling of products from a larger production line so that the speed of the production line is not affected by the measurement process.

The method may further include the step of comparing the determined temperature of the object against a predetermined criterion and removing an object from the conveyance system if its determined temperature does not meet the criterion or returning the object to the main conveyance if its determined temperature meets the criterion.

Thus the method can select objects from the main conveyance for measurement. This selection can be periodic (e.g. every tenth object or similar), or may be random. The selection could also be driven by further testing of the objects before they reach the first selection mechanism, which might identify objects which are thought not to meet the criterion for other reasons.

The selected objects can then be tested and either reject them by removing them from the conveyance system, or returning them to the main conveyance.

In the case where the measurement unit forms part of the main conveyance, the step of removing may remove objects which do not meet the criterion from the main conveyance.

The method may further include agitating the object prior to measuring the radiation. For containers having liquid contents, this agitation can help to ensure that the temperature of the object as a whole is uniform.

In certain embodiments the method further includes the step of calibrating the determination of temperatures from the measured radiation, the step of calibrating including the sub-steps of: conveying a reference sample to a second measurement position; measuring the temperature of the reference sample using a temperature probe; conveying the reference sample to the measurement position; measuring the radiation emitted from the object; and calibrate the determinations of temperatures of objects based on the temperature of the reference sample measured by the temperature probe and the radiation measured from the reference sample. This may be repeated for multi-point calibration steps using several reference samples at varying temperatures.

In this way, the method can auto-calibrate by checking the accuracy of the temperature determinations being made based on the temperature determined for the reference sample (s) whose temperature has been measured independently prior to the measurement by the radiometric process.

The step of calibrating is preferably performed on a repeated basis to maintain the calibration of the calculations.

The method of this aspect may include any combination of some, all or none of the above described preferred and optional features.

The method of the above aspects are preferably implemented by an apparatus according to the first aspect of this invention, as described above, but need not be.

A third aspect of the present invention provides an apparatus for measuring the temperature of an object, the apparatus including: a conveyance system; and a temperature measurement unit having: controller and at least one arm whose motion is controlled by the controller; and a probe attached to said arm and having a temperature sensor, wherein the conveyance system is arranged to convey the object to a measurement position proximate said arm and the controller is arranged to automatically control the motion of the arm so as to cause the probe to penetrate the object, such that a temperature measurement of the object can be taken from the temperature sensor.

The apparatus of this aspect can provide automated temperature measurement of objects in a production line setting. This reduces the variability associated with manual testing. In particular the apparatus can ensure accurate and repeatable positioning of the probe within the object being measured, and ensure that the probe remains in the object for long enough for an accurate measurement of the temperature to be obtained.

Preferably the controller controls the motion of the arm so as to cause the probe to penetrate the object to a predetermined depth. This can ensure the accurate and repeatable positioning of the temperature sensor within the object when the temperature measurement is taken.

The apparatus may further include a position sensor which provides information on the position of the temperature sensor to the controller. This position sensor may be a specific sensor, such as a laser ranging device positioned on the arm which determines its position relative to the object, from which the position of the temperature sensor can be derived. Alternatively or additionally the position sensor can work based on the movement of the arm from its known base or starting position.

Preferably the controller acquires information about the object and the predetermined depth is calculated so as to cause the temperature sensor to be positioned approximately in the geometric centre of the object or a part of the object. For many objects, the operator is interested in knowing the core temperature of the object (which is least likely to be affected by the surrounding environment). However, for certain objects, the temperature of other parts of the object will be of interest, for example to determine that the outer regions of the object have not cooled (or warmed up) more than acceptable during the passage of the object along a production line.

Preferably the controller controls the motion of the arm so as to cause the probe to remain in the object until a stabilised temperature measurement is made.

Generally, the temperature is considered stabilised when a consistent reading is obtained for a predetermined period of time (for example 1 to 3 seconds). This avoids spikes or spurious readings resulting from cold/hot spots in the product, such as an ice crystal. Although the apparatus will generally record the entire output of the sensor from the point of entry of into the object, it is the stable maximum or minimum temperature which is of most interest and on which the accept/reject decision is made.

The amount of time which constitutes a stable temperature measurement can be adjusted/programmed by the user, but can also be set for each type of object and stored and retrieved from a database depending on the product being processed.

Preferably the apparatus further includes a scanner which obtains information about the product from the object whilst it is being conveyed to the measurement position or when it is at the measurement position. Where the information is obtained from text or a code (such as a barcode) on the object itself, the apparatus may have multiple scanners arranged around the conveyance system to ensure that at least one such scanner is able to read the information. Alternatively or additionally, the objects may carry identification (such as an RFID device) which enable the scanner to obtain information about the product.

By identifying the type of product, further information about the product can be retrieved from a database. This further information may include the size and shape of the object. The further information may also include acceptable temperature ranges for the object which can be used for the basis of an accept/reject decision.

Alternatively or additionally the apparatus may have one or more measurement devices (e.g. laser ranging devices) which allow the dimensions of the object to be determined.

Preferably the apparatus further includes guide elements arranged on the conveyance to cause the object to arrive at the measurement position and/or to stop the object at the measurement position. Such guide elements can ensure accurate positioning of the probe within the object and may be adjustable to work with products of different shapes and sizes.

Alternatively or additionally, the apparatus may have a plurality of probes and temperature sensors arranged in an array. The array of probes can be brought into contact with the object by movement of the arm. Some of the probes in the array may contact the object, whilst others may not, but the array can ensure that at least some contact and penetrate the object to measure its temperature, regardless of the positioning or orientation of the object relative to the apparatus.

The probe or probes may be elastically-biased towards the object so that, whilst it can penetrate the object, if it encounters a solid item (whether inside the object or outside), it is able to recoil against the biasing rather than attempt to move further.

The apparatus of the present aspect may include any or all of the optional or preferred features of the above described first aspect which do not relate to the specifics of the radiometric sensing of that apparatus.

The apparatus of the present aspect may include any combination of some, all or none of the above described preferred and optional features.

The apparatus of the present aspect may operate by carrying out a method according to the second aspect of this invention described below, but need not do so.

A fourth aspect of the present invention provides a method of measuring the temperature of an object, on a conveyance system, the method including the steps of: locating the object on the conveyance system; conveying the object to a measurement position using the conveyance system; when the object arrives at the measurement position, automatically causing a probe having a temperature sensor to penetrate the object and taking a temperature measurement of the object using the temperature sensor.

The method of this aspect can provide automated temperature measurement of objects in a production line setting. This reduces the variability associated with manual testing. In particular the apparatus can ensure accurate positioning of the probe within the object being measured, and ensure that the probe remains in the object for long enough for an accurate measurement of the temperature to be obtained.

Preferably the step of penetrating causes the probe to penetrate the object to a predetermined depth. This can ensure the accurate positioning of the temperature sensor within the object when the temperature measurement is taken.

The method may further include the step of determining the position of the temperature sensor during the step of penetrating. This may involve direct sensing of the position of the probe and/or arm relative to the object (such as determining the position of the arm relative to the object, from which the position of the temperature sensor can be derived). Alternatively or additionally the position may be determined based on the movement of the arm from its known base or starting position.

Preferably the method further includes the steps of: acquiring information about the object; and determining the predetermined depth from said information such that the predetermined depth causes the temperature sensor to be positioned approximately in the geometric centre of the object or a part of the object. For many objects, the operator is interested in knowing the core temperature of the object (which is least likely to be affected by the surrounding environment). However, for certain objects, the temperature of other parts of the object will be of interest, for example to determine that the outer regions of the object have not cooled (or warmed up) more than acceptable during the passage of the object along a production line. This would provide an accurate and repeatable temperature profile of a product.

Preferably the temperature measurement is monitored whilst the probe is in the object and the probe is withdrawn from the object when a stabilised temperature measurement has been taken. Thus the method can ensure that the probe is in the product for a sufficient time for the stabilised measurement to be achieved.

Generally, the temperature is considered stabilised when a consistent reading is obtained for a predetermined period of time (for example 1 to 3 seconds). This avoids spikes or spurious readings resulting from cold/hot spots in the product, such as an ice crystal. Although the method will generally record the temperature measurements from the point of entry of the probe into the object, it is the stable maximum or minimum temperature which is of most interest and on which the accept/reject decision is made.

The amount of time which constitutes a stable temperature measurement can be adjusted/programmed by the user, but can also be set for each type of object and stored and retrieved from a database depending on the object being processed.

Preferably the method further includes the step of acquiring information about the object. This may be through scanning the product whilst it is being conveyed to the measurement position or when it is at the measurement position.

The information typically includes information identifying the object. By identifying the type of product, further information about the object can be retrieved from a database. The further information may include the size and shape of the object. The further information may additionally or alternatively include acceptable temperature ranges for the object which can be used for the basis of an accept/reject decision. The further information may additionally or alternatively include the length of time which constitutes a stabilised temperature measurement for that object.

Alternatively or additionally the dimensions of the object may be determined as it passes along the conveyance system, or when it arrives at the measurement position. This may be done, for example, by laser measurement.

The method may further include the step of guiding the object to arrive at the measurement position in a particular orientation, or with a particular degree of precision. This can ensure accurate positioning of the probe within the object.

Alternatively or additionally, the apparatus may have a plurality of probes and temperature sensors arranged in an array. The method may include bringing the array of probes into contact with the object by movement of the arm. Some of the probes in the array may contact the object, whilst others may not, but the array can ensure that at least some contact and penetrate the object to measure its temperature, regardless of the positioning or orientation of the object relative to the apparatus.

The probe or probes may be elastically-biased towards the object so that, whilst it can penetrate the object, if it encounters a solid item (whether inside the object or outside), it is able to recoil against the biasing rather than attempt to move further.

The method of the present aspect may include any or all of the optional or preferred features of the above described second aspect which do not relate to the specifics of the radiometric sensing of that method.

The method of this aspect may include any combination of some, all or none of the above described preferred and optional features.

The method of the above aspects are preferably implemented by an apparatus according to the third aspect of this invention, as described above, but need not be.

A fifth aspect of the present invention applies the method of the above described fourth aspect, including some, all or none of the preferred and optional features of that aspect, to a handheld temperature probe. Whilst this method would not have the advantages of automation, it could allow closer control of the handheld probe, for example by sensing the position of the temperature sensor in the object and/or determining when a stabilised temperature measurement has been obtained. The method may include providing feedback (e.g. visual or audible signals) to the user of the handheld probe to indicate when the correct probe depth is reached and/or when a stabilised temperature measurement has been achieved. Even if the position or depth is not controlled the method could calculate the stabilised values as mentioned above which could be recorded in the instrument and relayed to the operator audibly and visually. The stored data could also be transferred to external computers by various means, such as Bluetooth, infrared, WiFi, USB etc.

A further aspect of the present invention is a handheld temperature probe for use in the method of the above fifth aspect and having features which enable the improved and/or semi-automated operation of that probe by an operator.

Further aspects of the present invention include computer software which, when run on a computer, carry out the steps of any of the above methods, including some, all or none of the preferred or optional features of those methods.

BRIEF DESCRIPTION OF THE DRAWINGS

Embodiments of the invention will now be described by way of example with reference to the accompanying drawings in which:

FIG. 29 shows, in schematic form, the measurement of an object by the array of FIG. 27.

DETAILED DESCRIPTION

Embodiments of the present invention will be set out in relation to food samples moving along a roller or belt conveyor, as is typical in the latter stages of a factory producing prepared food. However, it will be appreciated that the principles of the invention described above and the details of the embodiments below can be applied to a range of situations, depending on the items whose temperature it is desired to sample.

Figures 1A, 1B:
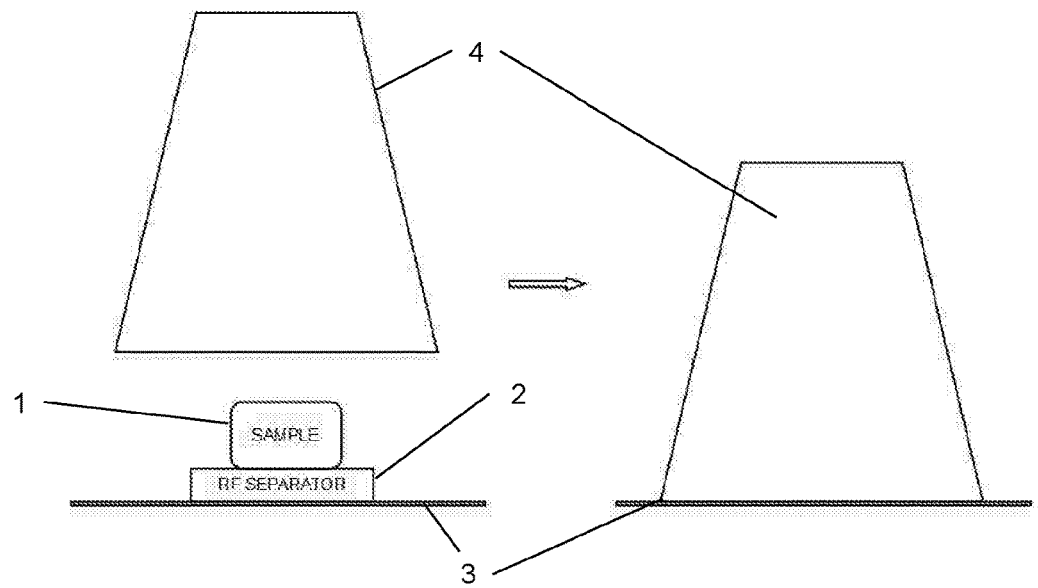
FIG. 1 shows the basic concept of embodiments of the present invention.

FIG. 1 shows the basic concept underlying the embodiments of the present invention. In FIG. 1a, a sample 1 whose temperature is to be measured is placed on top of a separator 2 (which is transparent or substantially transparent to radiofrequency electromagnetic waves). The separator 2 is positioned on a conductive or radiofrequency-reflective base plate 3. A movable cover 4 (also conductive/radiofrequency-reflective) descends over the sample and makes a radiofrequency grade seal to the base plate 3. The closable entrapment space inside the movable cover 4 forms, in conjunction with the base plate 3, a Faraday cage around the sample. The radiofrequency waves generated by the sample can be coupled to a measurement device (not shown) in order for the temperature of the sample to be measured. The details of a suitable microwave measurement method are set out in U.S. Pat. Nos. 6,964,514 and 7,059,765, and such methods are hereby incorporated by reference and will not be described further here.

The measurement in this manner is typically completed within five to ten seconds and can be stored electronically in a memory of the measurement apparatus, or in a connected computer (or on other, non-transitory, memory media).

The separator 2 is used to position the sample 1 within the final cavity configuration to improve the coupling between the cavity and the sample 1. The microwave relationship between the antenna (not shown) and sample is known to be affected by the location of the sample, within the faraday cage: central within the cavity is best, both in the horizontal and vertical directions; and the nearer the sample is to a conducting wall, the poorer the coupling. This is supported by standing wave modelling that has been carried out for, for example, microwave ovens.

However, since the samples being tested may vary widely in size, from small pots to large boxes of frozen food, it is not always practical to achieve absolute centring of the sample within the cavity (although if an apparatus is always to be used for measuring the temperature of a single product, the size and position of the separator 2 can obviously be optimised for that product).

The separator 2 in the present embodiments is chosen as a working compromise and comprises a nylon floorplate, elevated on nylon blocks, to lift the sample 2 or 3 centimetres above the base. Naturally the material of the separator is chosen to have minimal or no impact on the measurement process and is therefore transparent or substantially transparent to radiofrequency signals.

In general terms, samples from the production line are intercepted and selected for testing. The embodiments below set out various ways in which this can be done and may take an "in-line" approach or a "diversion" approach. The selected samples are conveyed to a measuring station at which a radiofrequency entrapment cavity (a Faraday cage which is sealed to ensure that all radiofrequency radiation within the cage is retained) is formed around the sample.

When the cavity has been sealed, the microwave measurement method is triggered until a reading is obtained and the temperature of the sample computed from that reading.

Once the measurement has completed, the cage is opened and the sample is either allowed to continue, or returned to the conveyor.

Three basic configurations are set out in the embodiments below. Firstly, the samples may be on a conveyor which pauses completely overall during the measurement. Secondly, the main conveyor may continue rolling uninterrupted, whilst samples for measurement are diverted onto a separate path to allow the measurement cycle to take place. Thirdly, the conveyor may continue and the measurement apparatus may be configured to move in concert with the conveyor whilst carrying out the measurement cycle, before moving back to an earlier point on the conveyor to make the next measurement.

A number of techniques for engaging the measurement apparatus with the samples can be used. For example if the conveyor is to be paused (whether as the main conveyor, or as a side conveyor onto which the selected samples are diverted) then the cavity can be arranged to descend over a sample paused beneath it (for example by a vertical-motion carriage which causes the cavity to descend onto the conveyor or a separate base plate). In this configuration, the base plate can be incorporated into the conveyor itself.

In order to divert samples onto an alternative path for measurement, controlled shover or diverter arms on the conveyor track are used to push selected samples periodically off into a side track.

The options for measurement of diverted samples are wider as the time taken to perform the measurement is less critical as it does not impact on the general conveyance of the other products. A number of mechanisms can be used to handle the sample and bring it to the measurement position and to form the cavity around the sample. For example, a roboticised "paddle" may be used to move the sample between different positions, including one in which the measurement process is carried out. The paddle itself may form one side of the cavity (i.e. as a base plate).

Alternatively a conveyor made up of a string of base plates in a caterpillar track fashion could be used as a conveyor in the diverted section. This conveyor can readily pause when required for the cavity to descend and the measurement be taken.

The formation of the cavity does not have to be in the form of a moving cover, but could instead be a substantially complete cavity with one or more doors through which the sample can enter and exit the cavity. The cavity can then be sealed by closing those door(s), for example by the door dropping down to seal with the base. The sample can be pushed into/out of the cavity by arms, or could be conveyed into the cavity on a conveyor which then forms part of the cavity and the doors seal to.

Figure 2:
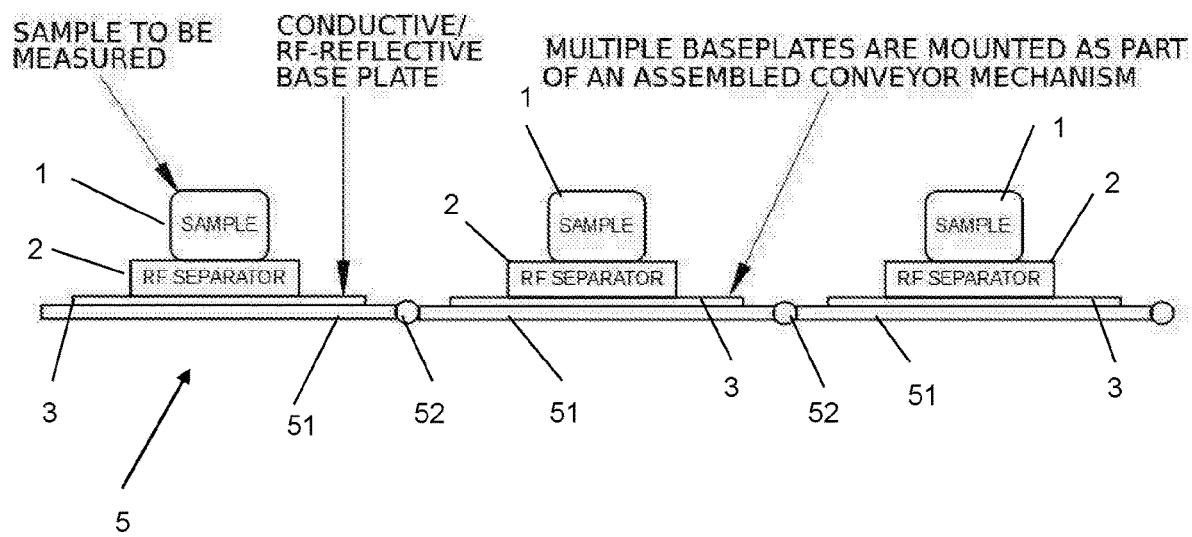
FIG. 2 shows a first embodiment of an apparatus according to the present invention.

FIG. 2 shows a first embodiment of the present invention in which a plurality of separate base plates 3 are mounted as part of a conveyor mechanism 5. Each base plate 3 has a separator 2 mounted on it in a substantially central position. Samples 1 can be placed onto or guided to sit on each separator as part of a larger industrial process.

Figure 3:
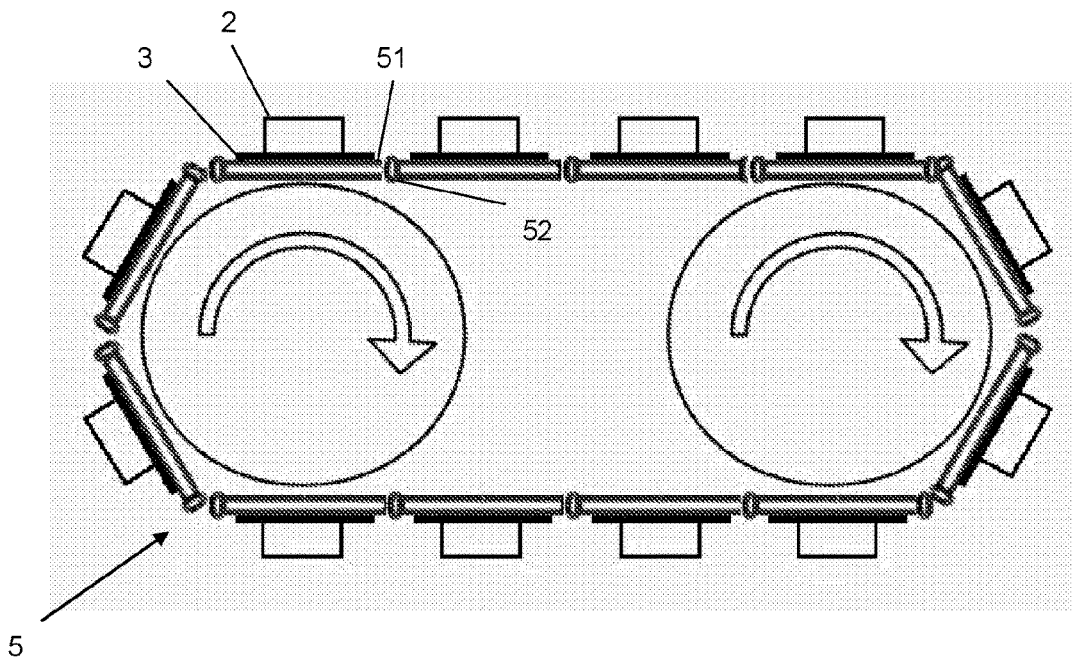
FIG. 3 shows how the apparatus of FIG. 2 can be incorporated into a continuous loop.

The conveyor mechanism includes a plurality of rigid plate elements 51, each of which has a base plate 3 and separator 2. Each plate element 51 is connected to the adjacent plate element by a hinged connector 52. The connectors 52 can allow the conveyor mechanism as a whole to form a closed loop, for example as shown conceptually in FIG. 3. In alternative arrangements, the plate elements 51 may be connected so as to allow connection in a closed loop in the plane of the plate elements (i.e. permitting rotation of the plate elements relative to the adjacent plate elements about an axis perpendicular to the plane of the plate elements).

Figure 4:
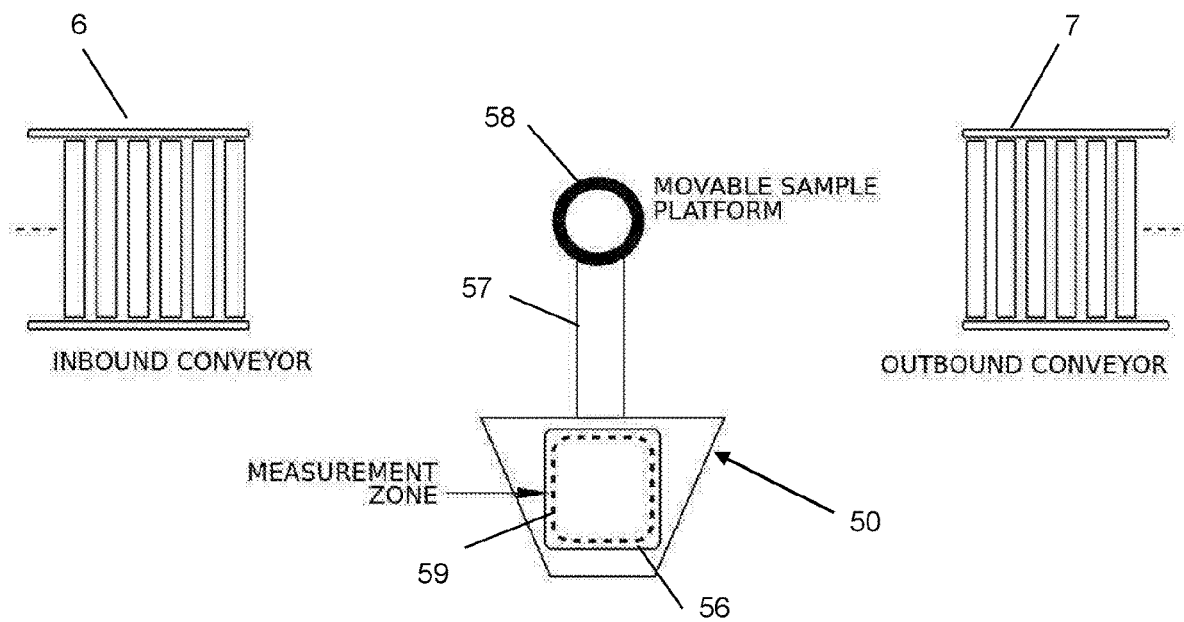
FIG. 4 shows a second embodiment of an apparatus according to the present invention.

FIG. 4 shows, conceptually, a second embodiment of the present invention in which a movable sample platform 50, which has an arm 57 connected to a paddle 56 and is rotatable about a substantially vertical axis (perpendicular to the plane of the figure) passing through a hub 58. The paddle 56 has a measurement zone 59 located on it. The sample platform 50 moves around the hub 58 so as to move samples between an inbound conveyor 6 and an outbound conveyor 7 via a measurement point at which the sample can be measured.

Figure 5:
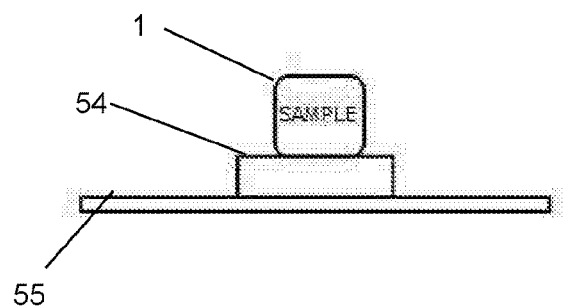
FIG. 5 is a side view of part of the apparatus of FIG. 4.

FIG. 5 shows a side view of the sample platform 60, which has a base plate 55 which is conductive/radiofrequency-reflective and a separator 54 which is transparent or substantially transparent to radiofrequency radiation and on which the sample 1 is placed in a similar configuration to the base plates 3 and separators 2 described in relation to the first embodiment above. In an alternative configuration, only the measurement zone 59 need be conductive and the surrounding parts of the paddle 56 can be made from a different material as the enclosure is configured to engage with the paddle entirely within the measurement zone.

Figure 6:
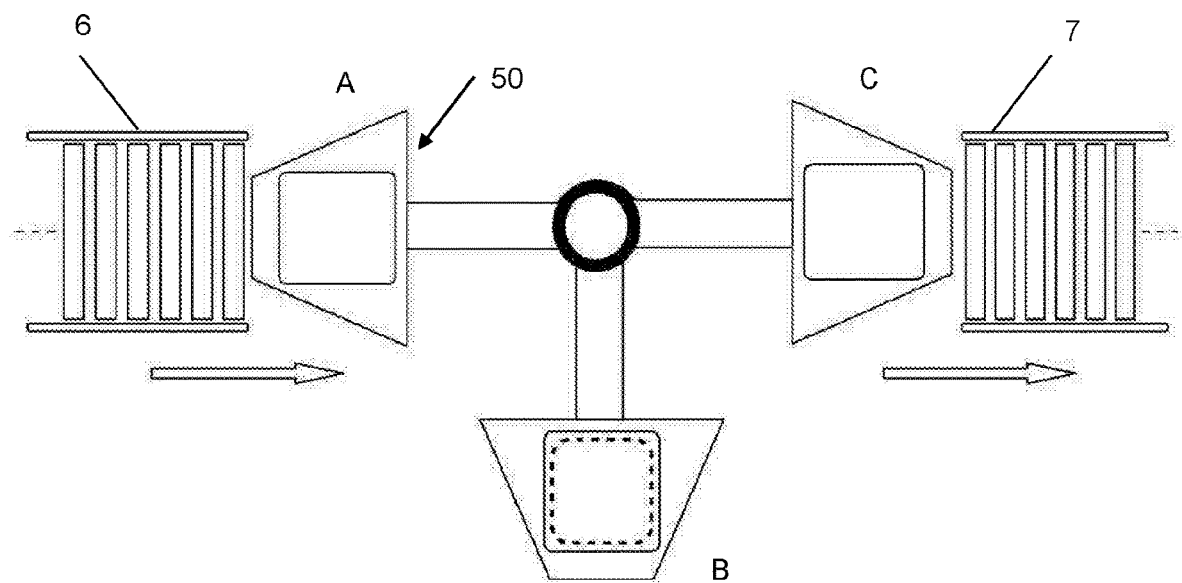
FIG. 6 illustrates the operation of the apparatus of FIG. 4.

FIG. 6 shows the apparatus of the second embodiment and illustrates the three positions of the sample platform 50. In a first position (A), the sample platform 50 is acquiring a sample from the inbound conveyor 6. In a second position (B), the sample platform 50 is at the measurement point and an enclosure (not shown) is lowered over the sample to form an entrapment space so that the radiofrequency waves from the sample can be detected and measured. In a third position (C), the sample platform 50 is delivering the sample to the outbound conveyor 7.

In a development of the second embodiment, not shown, the movable sample platform 50 has a plurality of arms (typically two, three or four) arranged equally around the hub, and each of the arms has a measurement zone with a base plate 3 and a separator 2 as shown in FIG. 5. It will be appreciated that the number of arms can be chosen based on the desired configuration of the conveyors and the space available. By having a plurality of arms, the sample platform 50 can perform a number of the steps required in the measurement process, such as receiving the sample, measuring the sample and delivering the sample, simultaneously on different arms, rather than having to perform them sequentially in a single arm device.

Figure 7:
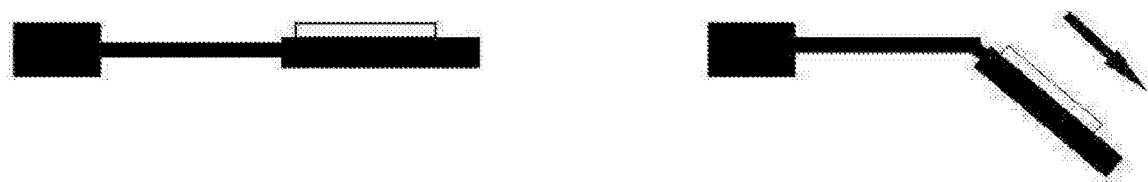
FIG. 7 illustrates an arrangement for the movement of products off the apparatus of FIG. 4.
Figure 11:
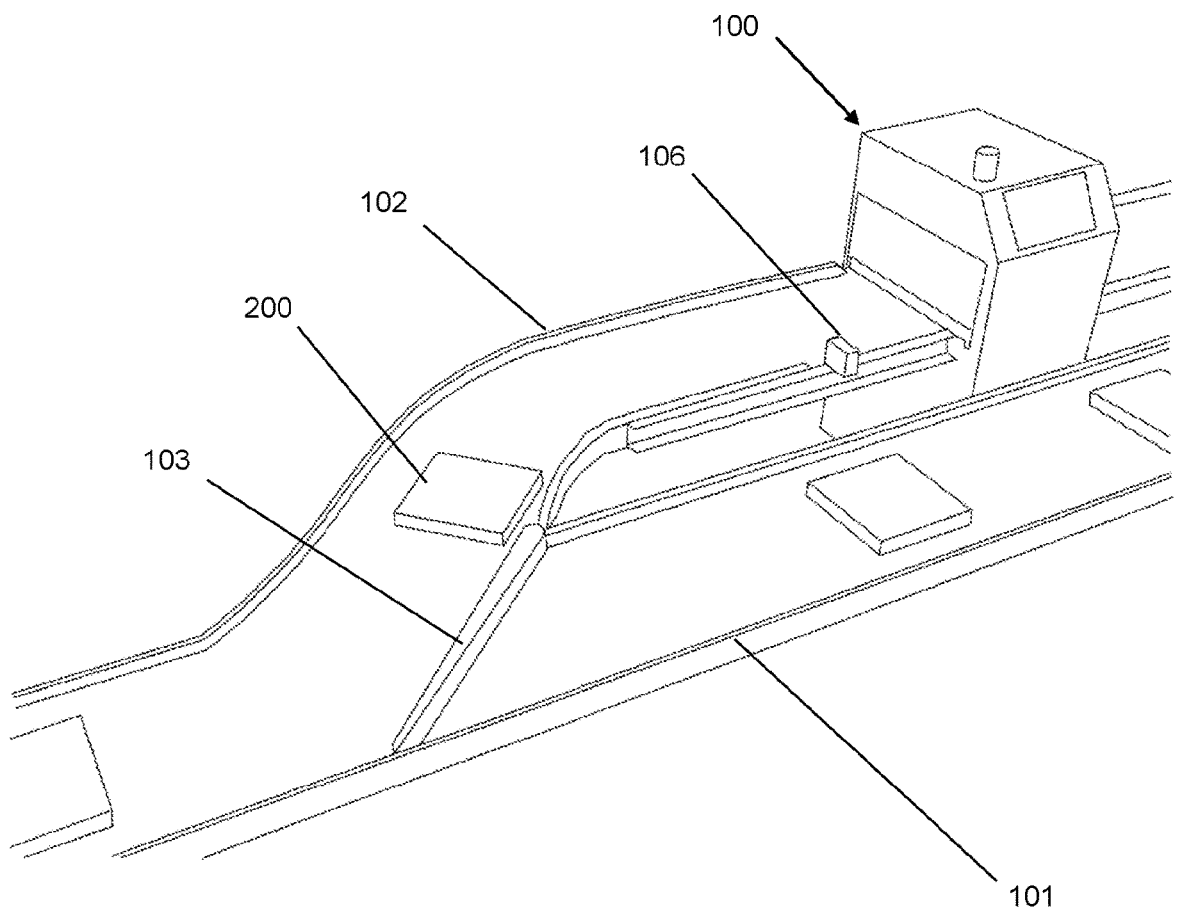
FIG. 11 shows the detail of the sample selection process in the embodiment of FIG. 10.

The sample 1 can be moved onto and off the separators 2, 54 in a number of ways which are already in common usage in the conveyors/production lines. These include pusher arms, gravitational drops, and grabs (which may be mechanical or suction operated). Merely by way of example, FIG. 7 illustrates how, in the second embodiment described above, a tilt action could be used to slide the sample off the sample platform 50. The arm 57 of the sample platform is hinged so that, whilst it is substantially horizontal when receiving a sample and when the sample is being measured (left hand side of FIG. 7), when the sample is to be offloaded onto the outbound conveyor, the arm 57 bends, causing the paddle 56 to tilt downwards and the sample (not shown) on the separator 54 to slide off onto the conveyor below.

In order to form a complete Faraday cage around the sample to ensure that there is minimal, and preferably no, leakage of microwave radiation when the cavity is closed to form an entrapment space, it is important that an effective radiofrequency seal is formed at all points of contact between the moving parts of the cavity.

Figure 8:
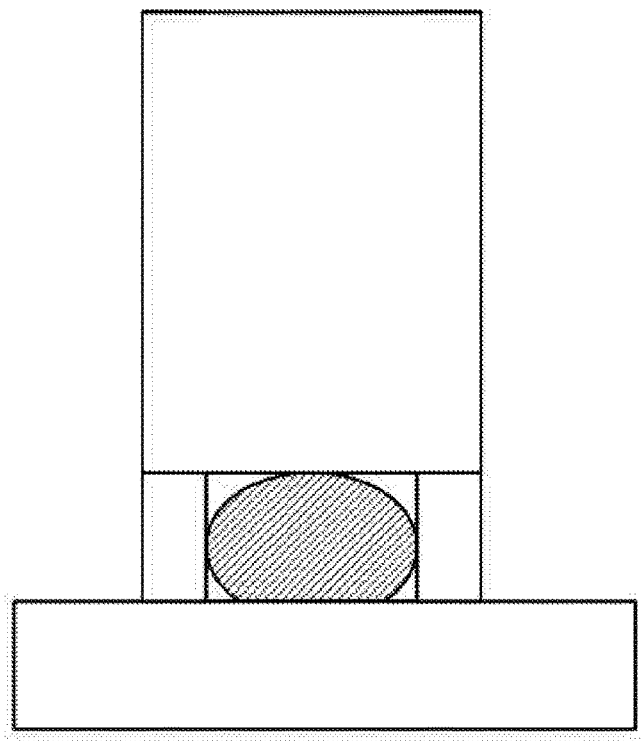
FIG. 8 shows a possible sealing configuration.
Figure 9:
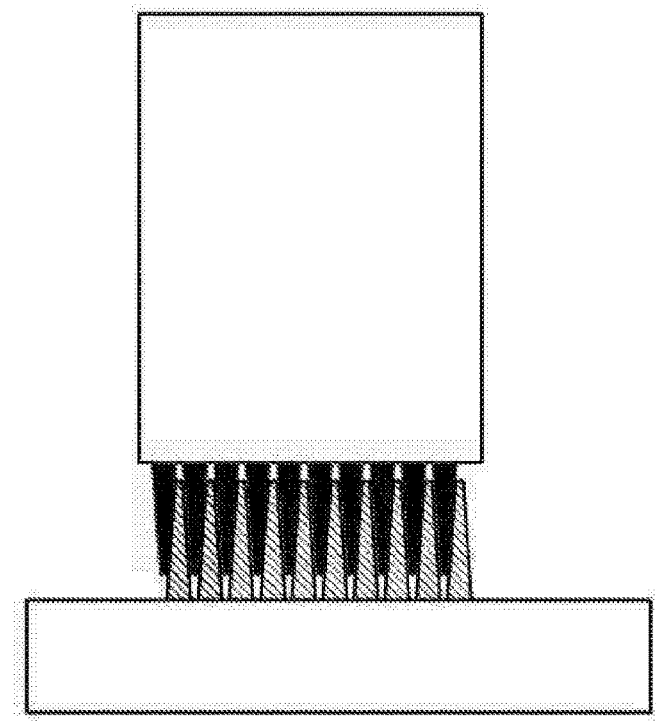
FIG. 9 shows another possible sealing configuration.

FIGS. 8 and 9 show two possible ways of providing the seal around the parts of the cavity that join (e.g. the base plate and the cover, or the door and the body of the cavity). In FIG. 8, a compressible conductive gasket 41 is located around the base of the wall 42 of the cover 4 (or alternatively at the junction of a door). When the cover 4 is lowered over the sample, a positive overpressure compresses the gasket 41 against the base plate 3 to ensure a complete seal around the full perimeter of the cover. The gasket 41 is itself conductive so that it forms part of the final Faraday cage around the sample.

FIG. 9 shows an alternative configuration for the seal in which the lower portion of the wall 41 is machined in a series of teeth 43. A corresponding series of teeth 33 are machined on the base plate 3 so that when the wall 41 is lowered to meet the base plate 3, the teeth on each part intermesh to form a labyrinthine seal. The teeth on both parts can be machined with a high degree of accuracy, but even if tolerances result in small separation between the teeth, the path from the interior of the cavity to the exterior is so long and tortuous that no radiation escapes. The teeth for this seal can be created by a number of methods such as chemical-etching on a solid metal component, pressing sheet metal, laser cutting on the face of a solid metal component or high-precision sandcasting (which allows casting with sub-millimetre precision).

Figure 10:
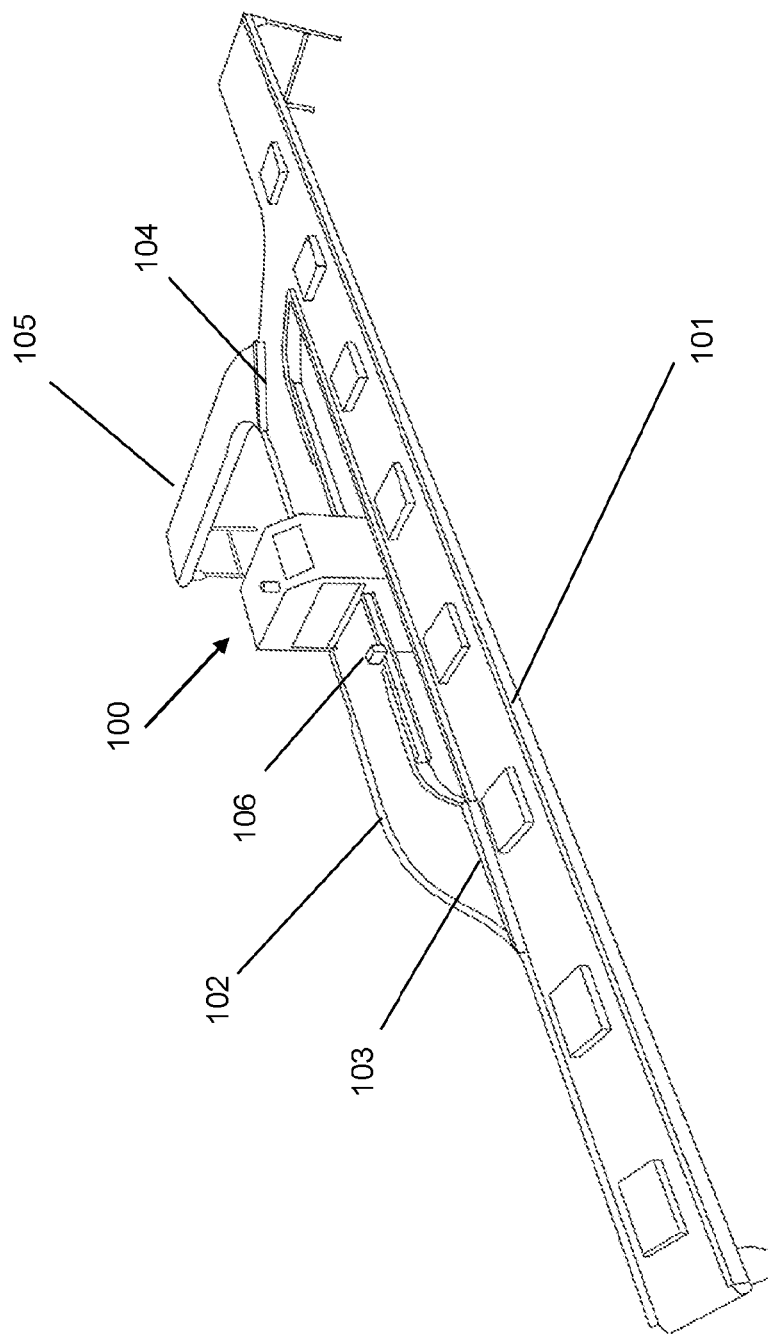
FIG. 10 shows a temperature measurement apparatus according to an embodiment of the present invention forming part of a conveyor system.

FIG. 10 shows a temperature measurement apparatus 100 according to a further embodiment of the present invention forming part of a conveyor system. FIGS. 11-15 show the operation of this system according to a further embodiment of the present invention. The conveyor system has a main conveyor 101 with a side arm 102 which passes through the apparatus 100. Food products 200 pass along the main conveyor, for example from the end of the production line to a packing station. Although the conveyor system present embodiment is described in relation to a specific type of temperature measurement apparatus, it will be appreciated that the principles of this system are readily applicable and used in conjunction with other forms of temperature measurement apparatus according to the present invention, including, but not limited to, those described in the above first and second embodiments.

A first diverter arm 103 is positioned at the junction of the main conveyor 101 and the side arm 102. The first diverter arm 103 can be moved (electro-mechanically or hydraulically) between its normal position blocking access from the main conveyor 101 to the side arm 102 (as shown in FIG. 10) to a diversion position (shown in FIG. 11) in which it causes a food product 200 to be diverted from the main conveyor 101 onto the side arm 102. The operation of the diverter arm 103 may be regular, for example, to test every tenth product, or may select products more randomly as a result of computer control.

Accordingly, as the products flow along the production conveyor, the first diverter arm 103 is computer controlled to move across the flow to divert a product onto the side arm 102. Once there the barcode of the product is read by an inline barcode reader 106. It will be appreciated that the use of an inline barcode reader is not restricted to the present embodiment and could be readily provided in conjunction with measurement apparatuses according to the first and second embodiments described above. Further barcode readers (not shown) may be positioned in other locations around the side arm 102 to ensure that the barcode on the product 200 is read regardless of its orientation. A manual barcode reader may also be provided to allow reading of the barcode from a product that has not been able to be read by the inline readers.

Figure 12:
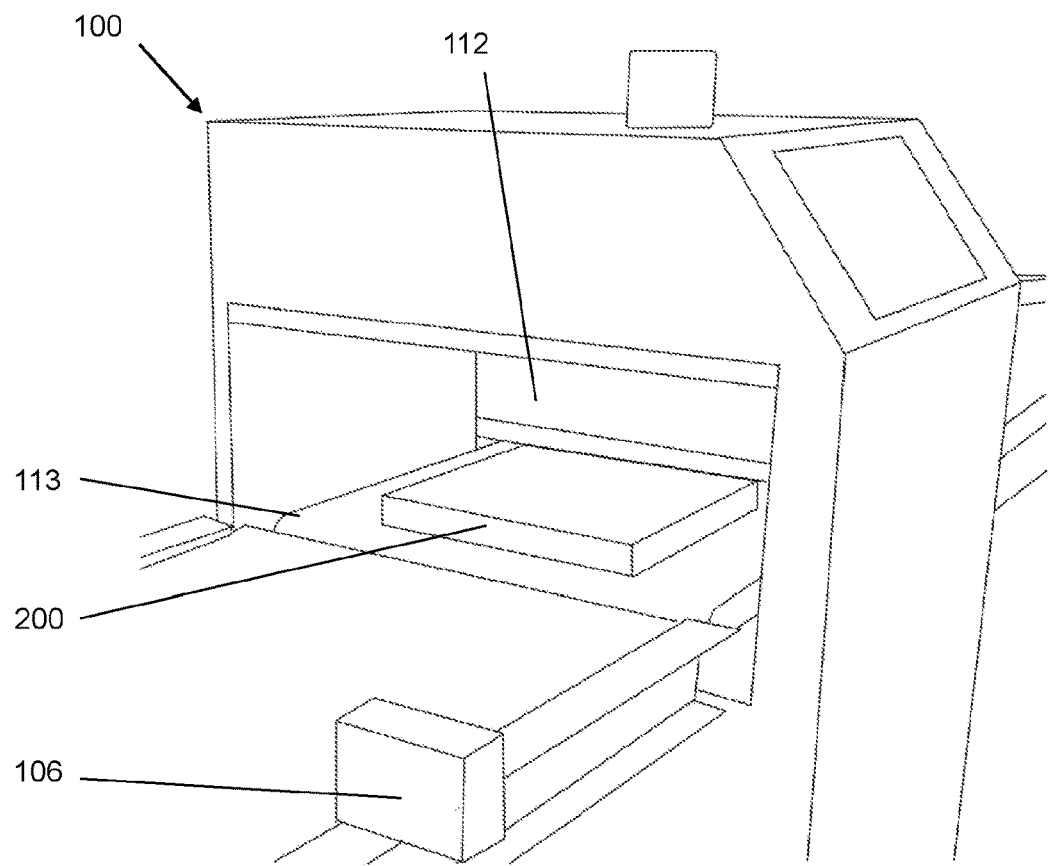
FIG. 12 shows a product entering the temperature measurement apparatus of FIG. 10.

Once on the side arm 102, the selected product 200 is guided by the conveyor to the temperature measurement apparatus 100. The apparatus comprises a radiofrequency reflective cavity which surrounds the line of the conveyor, as shown in FIG. 12. The apparatus 100 has two doors 111 and 112 on either side to allow products to enter and leave the cavity and an internal support 113 which is transparent to radiofrequency radiation.

The product may be moved from the side arm 102 onto the internal support by the action of the side arm conveyor itself, possibly with the assistance of gravity (e.g. a small slope in the side arm 102 as it approaches the measurement apparatus 100). In other embodiments (not shown), a pusher arm or arms may be moved into place behind the product as it approaches the measurement apparatus and push the product onto the support 113. These pusher arms may operate electrically, hydraulically or mechanically. The pusher arms may "pop-up" through the side arm 102, or may be moved into position from alongside or above the side arm. The same pusher arms may be used to push the product out of the measurement apparatus once the measurement has been completed.

Guides may be provided on the support 113 to ensure correct positioning of the product within the measurement apparatus.

Figure 13:
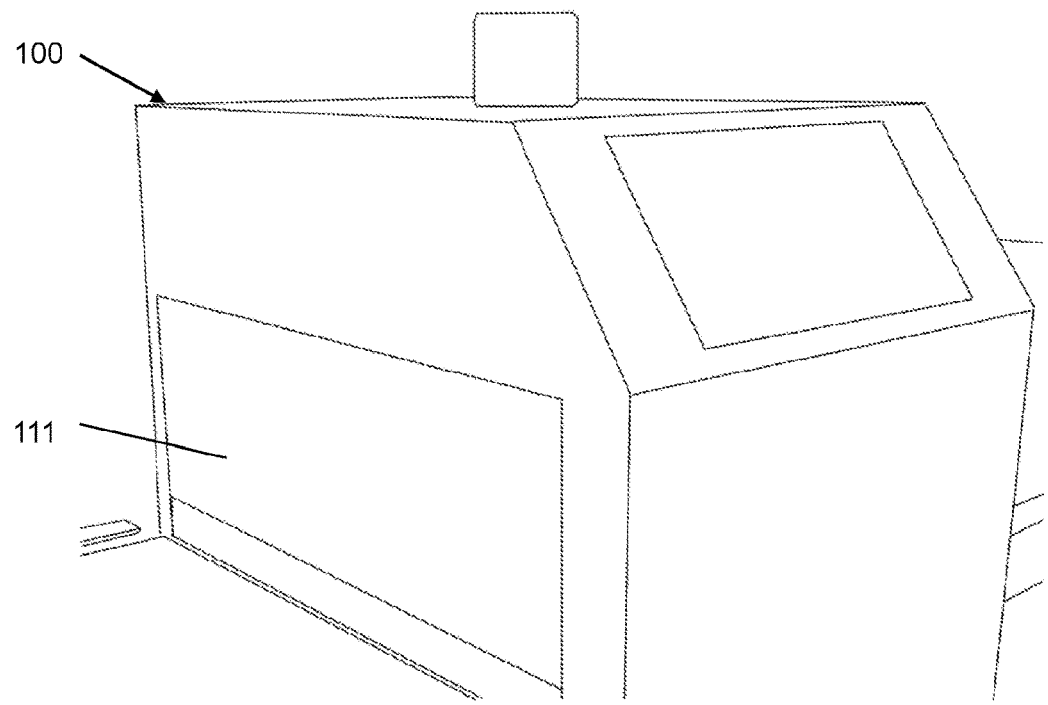
FIG. 13 shows the temperature measurement apparatus of FIG. 10 in a sealed configuration.
Figure 14:
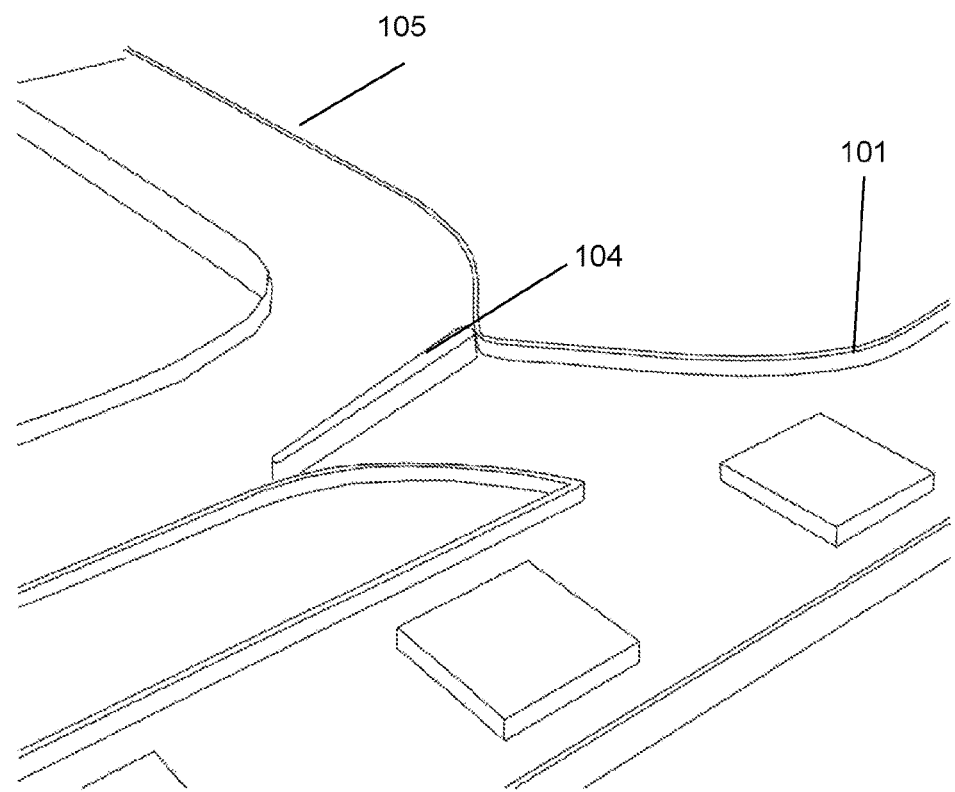
FIG. 14 shows the detail of the rejection process in the embodiment of FIG. 10.
Figure 15:
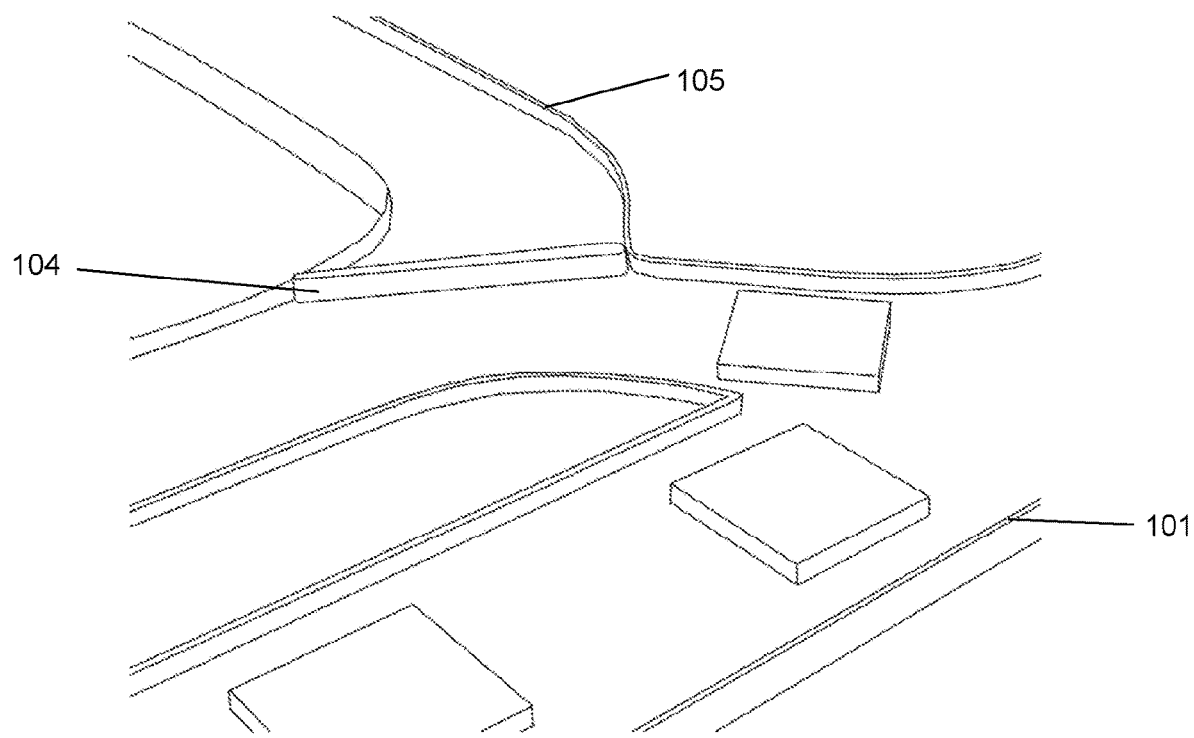
FIG. 15 shows the detail of the return process in the embodiment of FIG. 10.

Once a product 200 enters the cavity as shown in FIG. 12 through the first door 111, the door closes to seal the cavity as shown in FIG. 13. A measurement of the electromagnetic radiation emitted from the product is taken by a radiometer, as previously described, from which the temperature of the product can be determined. The calculated temperature and/or radiation measurement can be stored by the measurement apparatus 100 in an internal memory, or sent to a connected computer (not shown) for storage. The temperature/radiation measurement can be associated with the product's barcode which has been read before the measurement, thus aiding staff and management in record-keeping.

At the distal end of the side arm 102, a second diverter arm 104 is positioned. This second diverter arm is movable between two positions which respectively allow the product 200 which exits the measurement apparatus 100 through the second door 112 to be rejected or sent for further testing by diverting it away from the main conveyor onto a reject track 105 (FIG. 14) or to be returned to the main conveyor 101 (FIG. 15) to join the other products. The operation of the second diverter arm 104 is linked to the temperature measurement apparatus 100, such that, if a product is found not to have a temperature within the required range for the product, it can be rejected or sent for further testing, whilst products having a temperature in the required range can be returned to the main conveyor 101 for packing or further processing. Although the apparatus will generally record the entire output of the radiometer and/or the calculated temperature from the start of the measurement (closure of the cavity), it is the stable maximum or minimum temperature which is of most interest and on which the accept/reject decision is made.

Thus the measured temperature value of the product can be compared with pre-set high and/or low temperate limits. Products that do not meet these limits are treated as rejects and automatically removed off the main production line flow. The products that are within limits continue to re-join the main production flow. Visual and audible alarm warnings could be provided to staff/management of any product that falls outside of these limits, which may, for example, alert staff to test more products from the same batch.

The conveyor system may further include a vibration table (not shown) positioned prior to the temperature measurement apparatus 100. The vibration table may be positioned in-line with the side arm 102 so that the product 200 is first moved from the side arm onto the vibration table and vibrated, before being moved into the measurement apparatus 100. For containers having liquid, or semi-liquid contents, such as soups or yoghurts, this vibration can help to ensure that the temperature of the object as a whole is uniform when it is measured by the measurement apparatus 100. In particular it can help to ensure that the measurement apparatus 100 does not measure only the radiation from the outer parts of the product (and therefore the temperature of these parts), when the core/central portion of the product is a different temperature.

Figure 16:
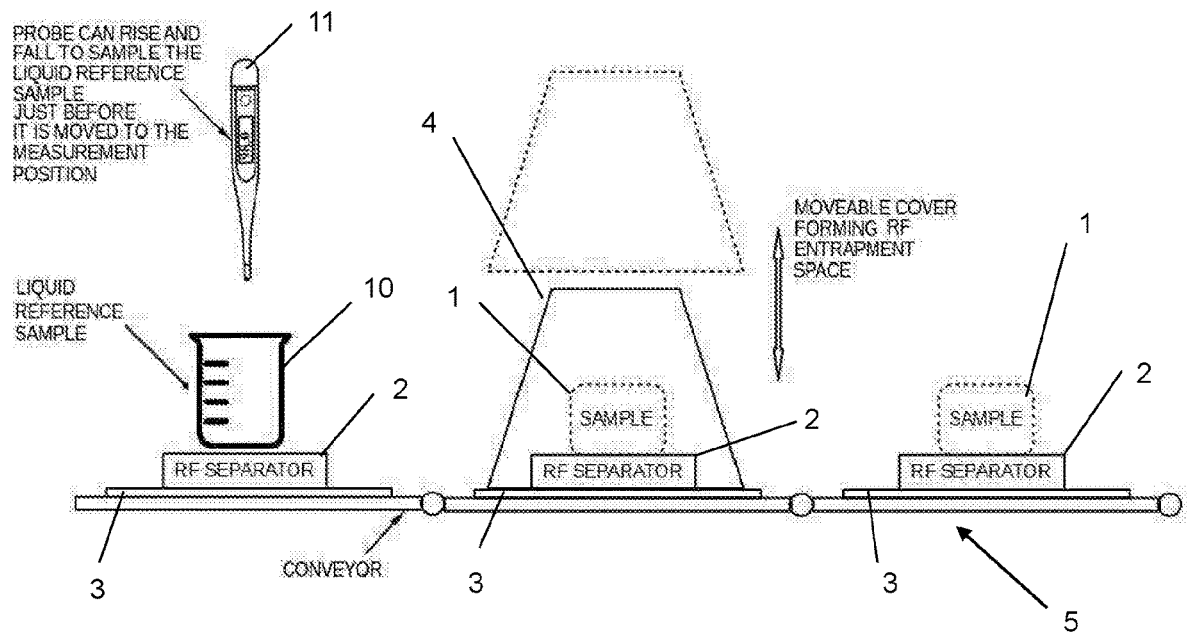
FIG. 16 shows the first step in an autocalibration method forming part of an embodiment of the present invention.
Figure 17:
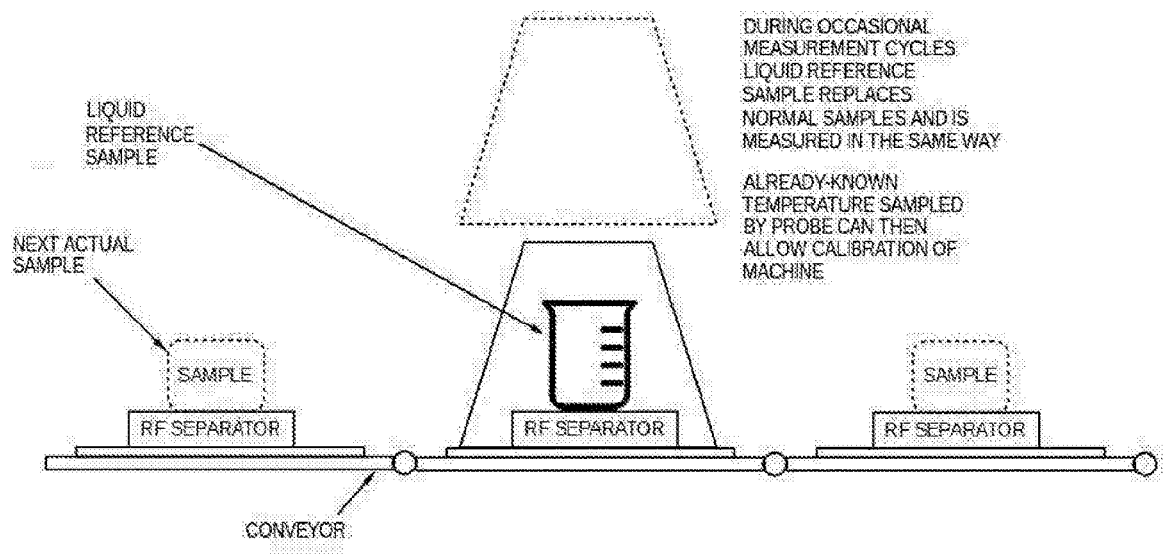
FIG. 17 shows the second step in the autocalibration method of FIG. 16.

FIGS. 16 and 17 illustrate a development of embodiments of the present invention in which an automatic calibration of the measurement apparatus is performed. In FIGS. 16 and 17 a conveyor of the type described above in the first embodiment of the present invention is used for the purposes of illustrating the method and configuration of the auto-calibration.

On one of the base plates 3 forming part of the conveyor mechanism 5, a reference sample 10 is placed. This sample can be introduced to the conveyor on a regular basis and removed from the conveyor after the calibration measurement has been carried out for re-use in a subsequent calibration. The process control can be configured to not place a sample 1 on one of the base plates as it passes the loading point and the reference sample introduced instead. The reference sample 10 can take any form. A liquid reference may be chosen due to the ease of measurement with a separate temperature probe.

Immediately prior to introduction to the measurement apparatus, the temperature of the reference sample 10 is measured by a separate temperature probe 11 (FIG. 16). For example, this may be done as the sample 1 immediately in front of the reference sample 10 is stopped under the cover 4 for measurement by the measurement apparatus. Alternatively the reference may have a known or highly stable temperature and therefore not require separate measurement.

Once the measurement cycle has completed, the conveyor 5 advances and the base plate 3 bearing the reference sample 10 is moved into position under the cover 4. The cover closes the cavity around the reference sample 10 and the measurement apparatus takes a measurement (FIG. 17). This measurement is then compared with the temperature of the reference sample 10 as measured by the temperature probe 11. This allows the measurement cycle for the reference sample to be seamlessly interleaved between real food sample measurements.

Although FIGS. 16 and 17 illustrate this development in relation to a conveyor-type arrangement, it will be appreciated that this approach could be applied to other configurations as well. In particular, in the paddle arrangement of the second embodiment described above, an additional arm could be provided which holds a sample which is at a known reference temperature (and whose temperature can be measured immediately before the calibration operation by a reference thermal probe as discussed above). This additional arm can be positioned in the measurement position on a periodic basis. This may be once every cycle in the event of a rotational arrangement with many arms, or may be less frequent, depending on the number of arms and the desired throughput of the measurement process.

As this auto-calibration process can be executed quickly and regularly, implementation of embodiments of the present invention in high-throughput production lines can be possible whilst retaining a high degree of reliability in the temperature measurement process. This could be done even if the production line was subject to high workload and limited maintenance time as it is not necessary to stop the production line to perform the calibration.

Figure 18:
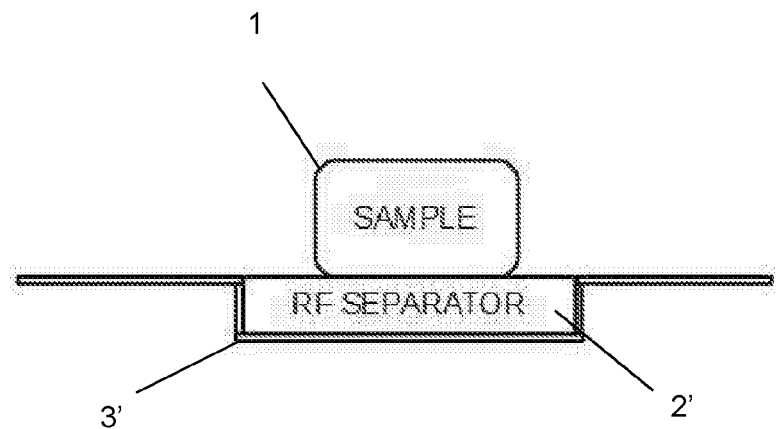
FIG. 18 shows an alternative arrangement of the base plate and separator that can be used in embodiments of the present invention.

In the above embodiments discussed above, the separator 2, 54 has generally been shown mounted on top of a base plate 3, 55 so as to provide separation between the reflective base plate and the sample 1. FIG. 18 shows an alternative arrangement in which the separator 2' is encapsulated within a recessed base plate 3'. This allows the sample 1 to sit at the same level as the portions of the base plate 3' surrounding the separator 2' and therefore allows easier movement of the sample 1 onto and off the separator (for example to and from conveyors).

Figure 19:
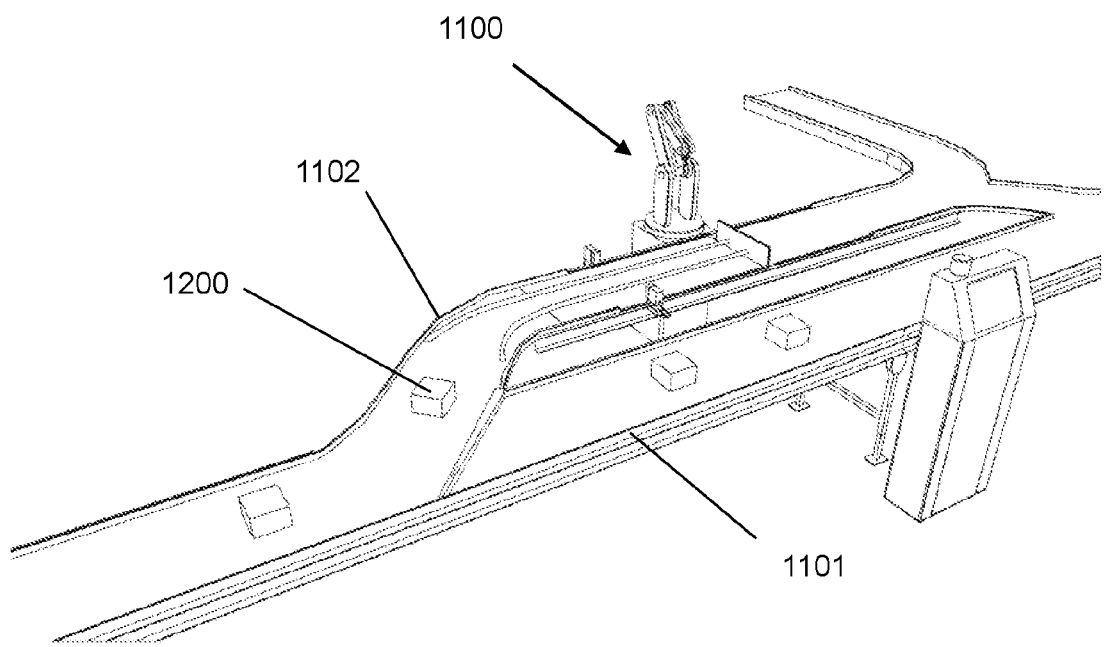
FIG. 19 shows a temperature measurement apparatus according to an embodiment of the present invention forming part of a conveyor system.
Figure 20:
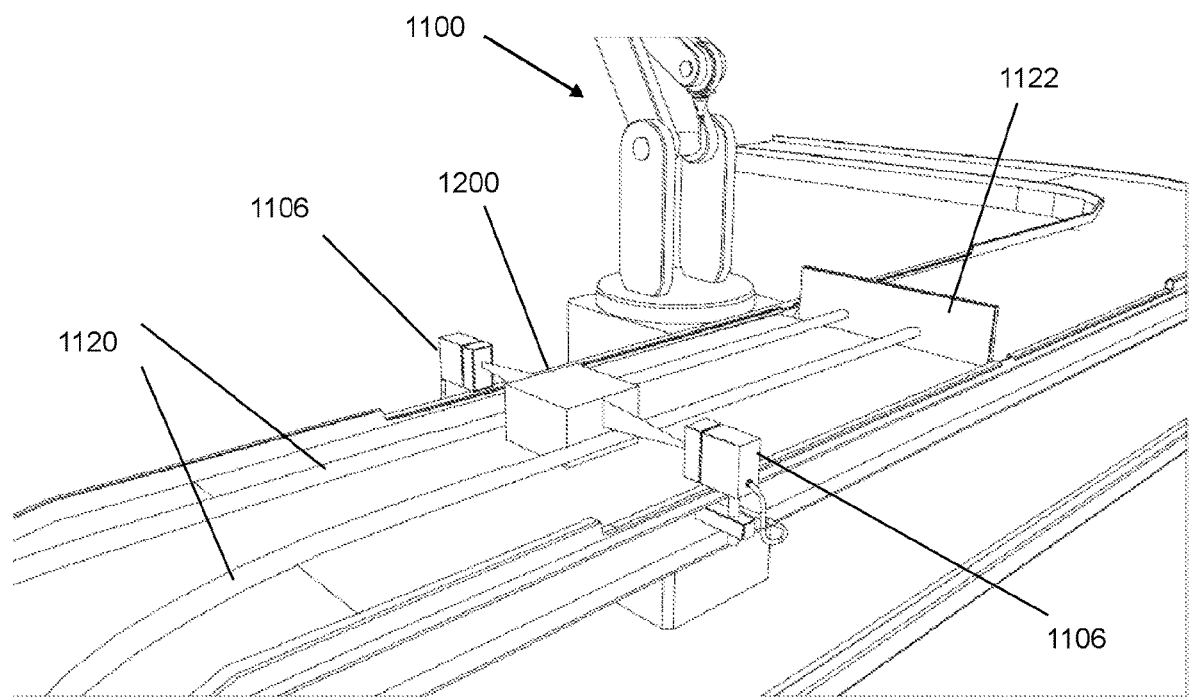
FIG. 20 shows the passage of an object which is to be measured by the apparatus of FIG. 19.

FIG. 19 shows a temperature measurement apparatus 1100 according to a further embodiment of the present invention forming part of a conveyor system. FIGS. 19-23 show the operation of this system according to a further embodiment of the present invention. The conveyor system has a main conveyor 1101 with a side arm 1102 which passes through the apparatus 1100. Food products 1200 pass along the main conveyor, for example from the end of the production line to a packing station. Although the conveyor system present embodiment is described in relation to a specific type of temperature measurement apparatus, it will be appreciated that the principles of this system are readily applicable and used in conjunction with other forms of temperature measurement apparatus according to the present invention. Further, the conveyor system according to this embodiment is broadly similar to that described above in relation to FIGS. 10-15, save for the detail of the measurement apparatus itself. Where similar components and features are used, these will not be described in detail in respect of this embodiment.

A first diverter arm 1103 is positioned at the junction of the main conveyor 1101 and the side arm 1102. The first diverter arm 1103 operates as described in the embodiment above.

Accordingly, as the products flow along the production conveyor, the first diverter arm 1103 is controlled to move across the flow to divert a product onto the side arm 1102. Once there the product engages with guides 1120 which position the product laterally on the side arm conveyor. It will be appreciated that other mechanisms to position the product may be used, and the guides 1120 (or other mechanisms) could be adjustable to handle products of different shapes and sizes. For example, the product may be first stopped when it has reached the measurement position in the axis of movement, and subsequently centred (or otherwise positioned in the perpendicular direction) once stopped. One way of doing this would be to use opposed pusher arms acting across the direction of flow of the conveyor.

As the product passes between the guides, a barcode of the product is read by an inline barcode reader 1106. In the embodiment shown, two barcode readers are shown on opposite sides of the side arm 1102, but a single reader may be used, or further barcode readers may be positioned in other locations to ensure that the barcode on the product 200 is read regardless of its orientation. A manual barcode reader may also be provided to allow reading of the barcode from a product that has not been able to be read by the inline readers.

Figure 24:
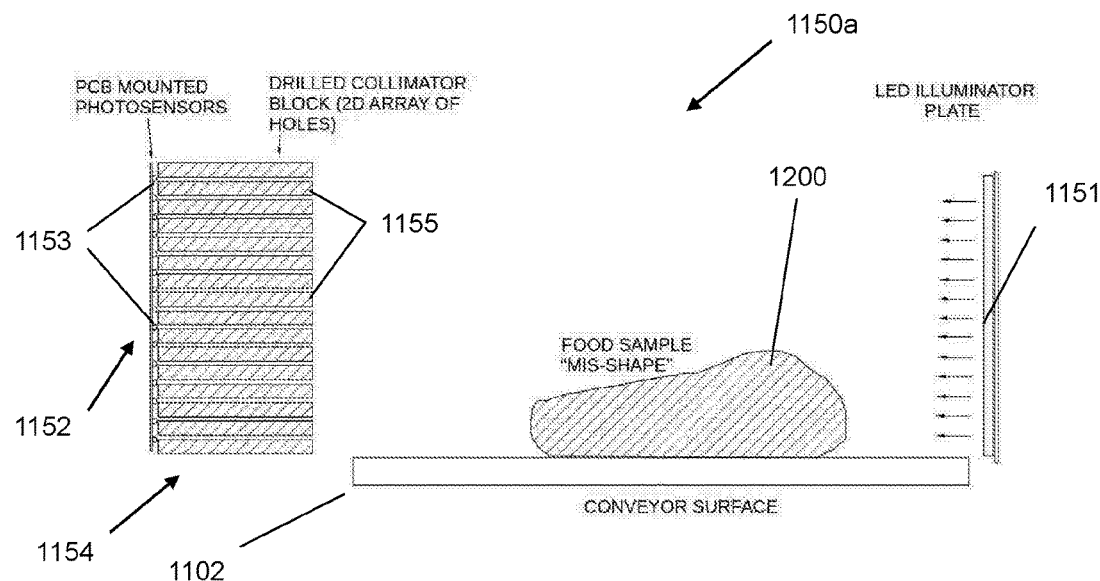
FIG. 24 shows the detail of a sensor arrangement for use in embodiments of the present invention.
Figure 25:
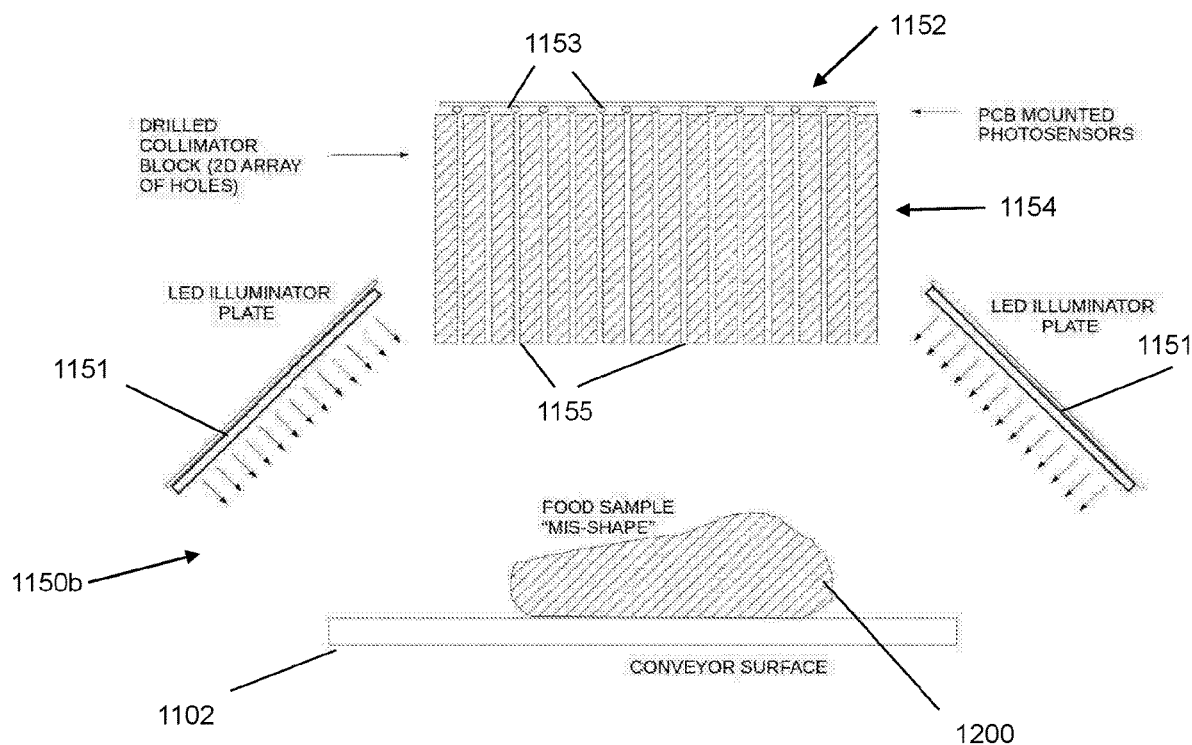
FIG. 25 shows the detail of a further sensor arrangement for use in embodiments of the present invention.
Figure 26:
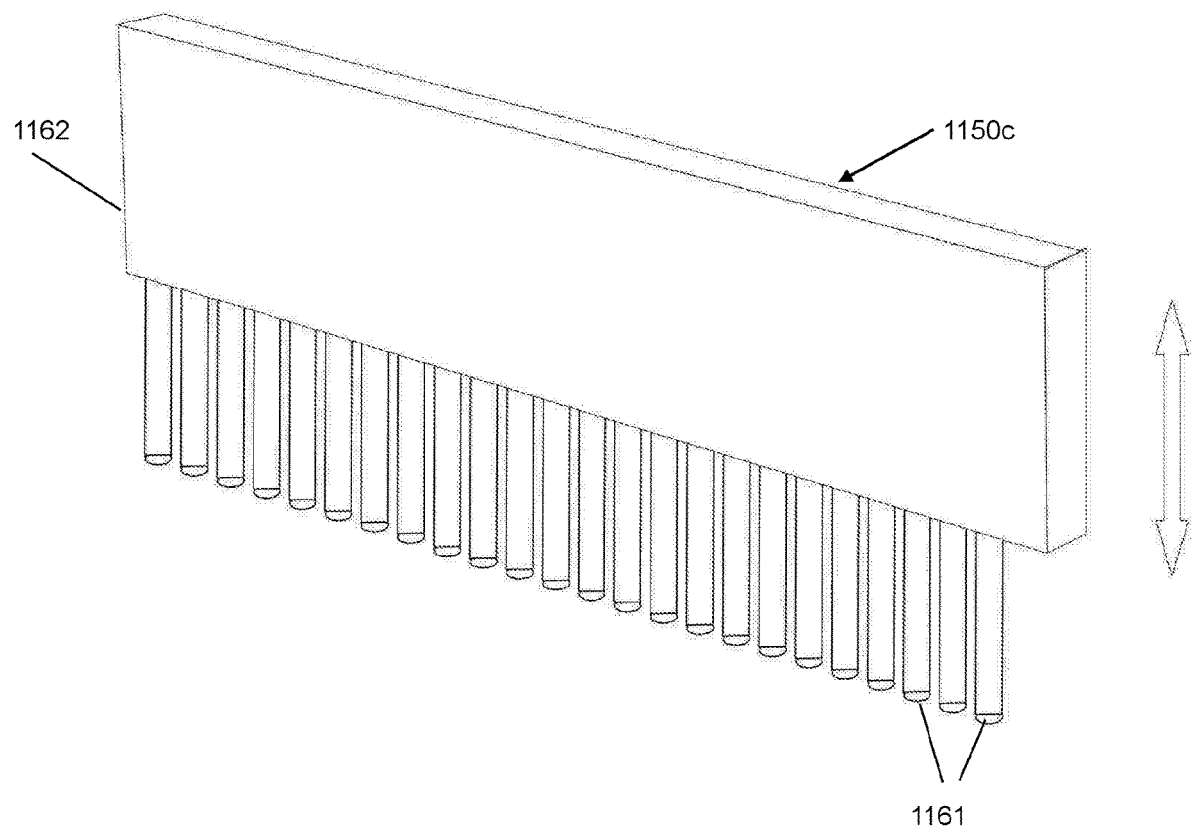
FIG. 26 shows the detail of an alternative sensor for use in embodiments of the present invention.

By reading the barcode, the apparatus is able to determine the product being tested. This allows information about the product, such as required temperature ranges, as well as the dimensions of the product to be retrieved from a computer database which stores such information in conjunction with the barcode. Optionally, the product dimensions may be read by laser measurement devices positioned around the side arm conveyor. Knowing the product dimensions, in particular the height, can assist in optimal positioning of the temperature probe 1130 when it engages with the product. Manual entry of the product dimensions is also possible, for example when initiating the measurement apparatus in conjunction with a particular production line. Further approaches to determining the dimensions of the product without using a barcode reader are illustrated in FIGS. 24-26 and are described in more detail below.

Figure 21:
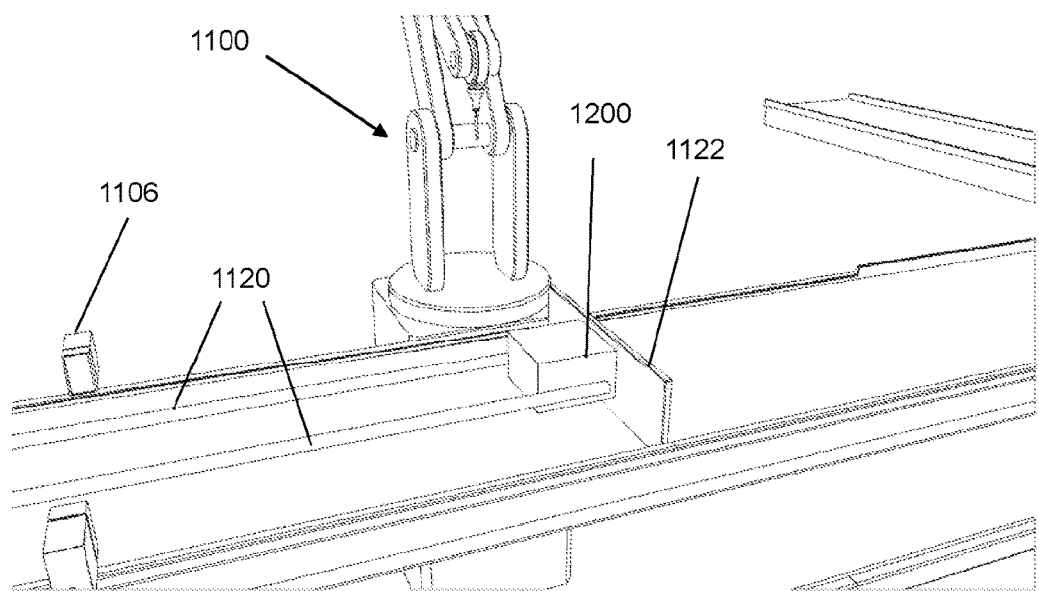
FIG. 21 shows the arrival of the object which is to be measured at the measurement position.

Once on the side arm 1102, the selected product 1200 is guided by the conveyor to the temperature measurement apparatus 1100 as shown in FIG. 21. A movable barrier 1122 stops the product at the measurement position which is directly beneath the apparatus 1100. The movable barrier 1122 is designed to be raised to stop a product in the measurement position and raised once the measurement has been completed to allow the product to continue. In conjunction with a conveyor surface which is sufficiently low friction to allow a product stopped by the barrier 1122 to slide over the surface of the conveyor, this allows the conveyor to continue operating whilst the measurement is being conducted, meaning that the motion of the conveyor does not also need to be controlled. Alternatively, the conveyor may be stopped when it is sensed that the product has engaged with the barrier, or has otherwise reached the measurement position (in which case no barrier is required). Other mechanical means may be used to accurately align/position the product into place on the conveyor. A visual camera system and/or laser measurement devices may also be used to determine the arrival of a product and check/control its positioning.

The apparatus 1100 comprises a temperature sensing probe 1130 which has an accurate temperature sensor located at or near its lower tip, such as an RTD (resistive temperature detector). The probe can take the form of a hypodermic needle or other device and is designed to be sharp enough to penetrate the packaging on the products which the probe is likely to be used to test.

Figure 22:
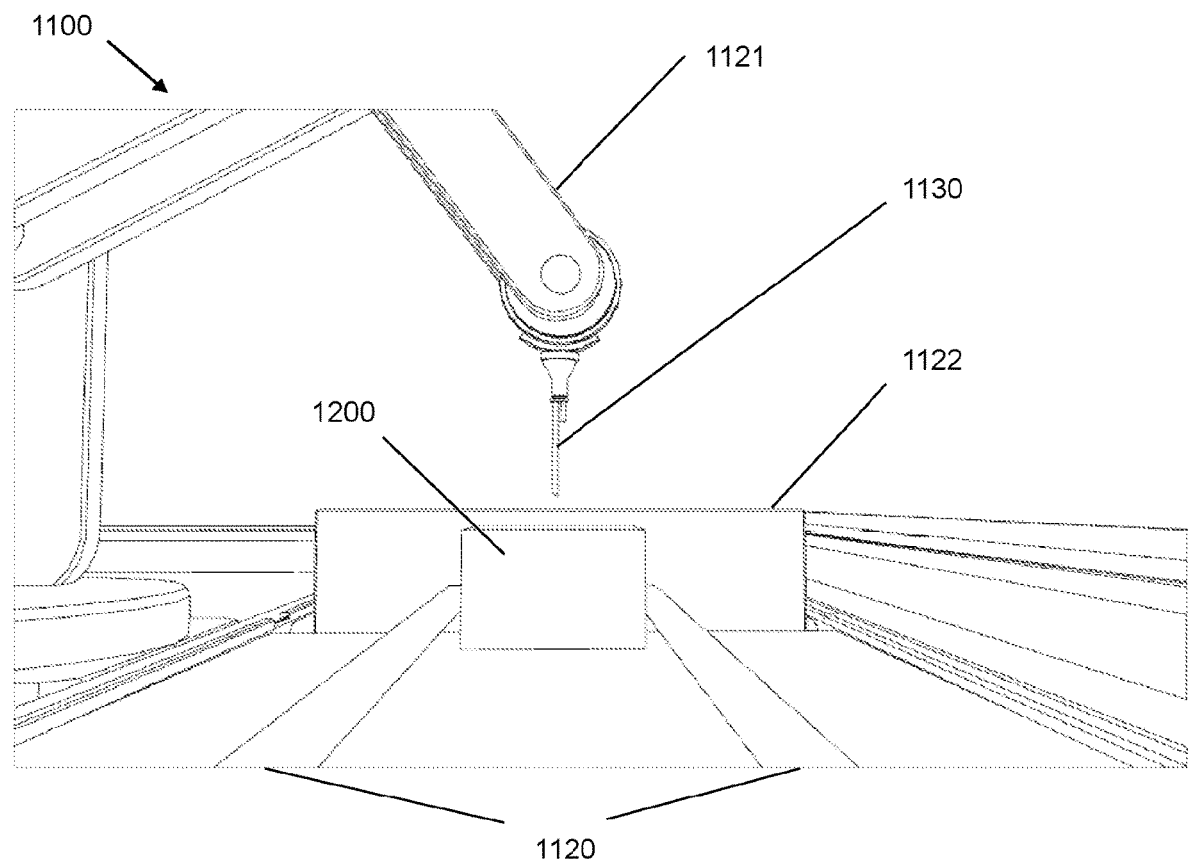
FIG. 22 shows the temperature probe of the measurement apparatus of FIG. 19 preparing to engage with the object.

The temperature-sensing probe is mounted on an arm 1121 or similar arrangement that is controlled to be raised or lowered above the conveyor as shown in FIG. 22. The arm 1121 may be hydraulically or electro-mechanically controlled and is typically a robot-type arm as shown in the Figures and commonly used in production lines.

Figure 23:
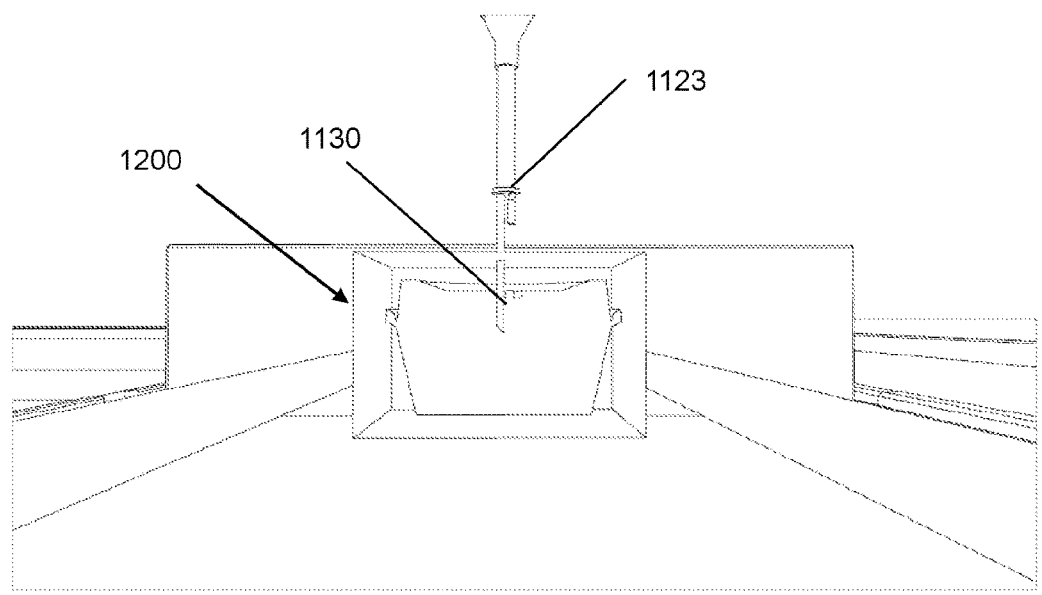
FIG. 23 shows a cross-section of the apparatus of FIG. 19 and the object being measured during the measurement step.

The arm 1121 is precision controlled to be lowered so that the probe 1130 penetrates the sample on the conveyor to a controlled depth as shown in FIG. 23. The exact final position of the probe (and therefore its depth in the product) is based on each product's specification as collected by the barcode reader(s) 1106 or programmed in advance and/or the data stored in the computer. For many products the ideal position will be in the exact geometric centre of the product. However, for some products it may be desired to measure temperatures closer to the surface of the product (e.g. for a product that is required to be frozen, it will often be the case that the outer parts of the product warm up quicker than the core due to the surrounding environment being above freezing temperature.

The probe 1130 is then held at the determined level while the temperature is measured, stored and calculated to be stabilised. The apparatus 1100 monitors the temperature measured by the temperature sensor to determine whether the measurement is stabilised. When a consistent reading is obtained for a predetermined period of time (for example 1 second), the temperature is considered stabilised. This avoids spikes or spurious readings resulting from cold/hot spots in the product, such as an ice crystal.

Although the apparatus will generally record the entire output of the sensor from the point of entry of into the sample, it is the stable maximum or minimum temperature which is of most interest and on which the accept/reject decision is made.

The amount of time which constitutes a stable temperature measurement can be adjusted/programmed by the user, but can also be set for each product and stored and retrieved from a database depending on the product detected by the barcode reader(s) 1106, or selected by a user.

The arm 1121 may be positioned into a known position simply by controlling its motion. Alternatively, the arm 1121 may be provided with a laser range finder 1123, which detects the distance of the arm from the top surface of the product 1200 and therefore allows the penetration depth of the probe 1130 to be controlled.

Once a stabilised level has been reached for the programmed amount of time, the arm 1121 is lifted and the probe 1130 removed from the product 1200. The product is then passed/moved from the measurement position and guided off to the reject side of the production conveyor. Note that, typically in this embodiment, all tested products 1200 will be rejected and not returned to the main conveyor 1101 due to the invasive nature of the measurement process. However, if the products being tested are considered to be unaffected by the invasive probing (which may be the case for products which are not intended for consumption, or for which potential contamination is not an issue), then the return/reject process described in relation to the embodiment above can be adopted.

The probe 1130 may have a housing which is provided to protect the probe at very high or very low temperatures, e.g. up to +500° C. and down to −100° C.

For food and medical applications the probe 1130 could be coated with an antimicrobial protection to prevent cross contamination between samples. An example of such coating is readily available under the trade mark Biocote®.

The intelligent decision making aspects of this method could also be applied to handheld temperature probes. For example, the product could be scanned before arriving at the operator performing the temperature measurement which would provide details of the product from the database. This may include probe depth and measurement time and the handheld probe may have measurement markings to allow the operator to determine the depth to which it is inserted and a timer to indicate when the required stabilisation time has passed.

The temperature probe 1130 and/or the product 1200 may also be agitated in any known way to mix certain products prior to measurement.

FIGS. 24-26 show alternative sensor arrangements for determining the dimensions of products.

The sensors 1150*a*, 1150*b* and 1150*c* shown in FIGS. 24-26 can be used with the measurement apparatuses of any of the embodiments described above, but are most relevant to determining the dimensions of products 1200 which are to be tested by the temperature measurement apparatus 1100 of the embodiment illustrated in FIGS. 19-23.

In such embodiments, these sensors may be positioned upstream of the apparatus 1100 or may be co-located with the apparatus. As the sensors are preferably operated with the product 1200 stationary, they are preferably co-located with the apparatus 1100 so that the product 1200 only needs to be stopped once for determination of both its dimensions and its temperature.

FIG. 24 shows a first such sensor 1150*a*, viewed along the translational axis of the side arm conveyor 1102. A diffuse LED illuminator plate 1151 (a plurality of LEDs mounted behind a diffuser) is arranged on one side of the conveyor 1102 and a corresponding array 1152 of photosensors 1153 is arranged directly opposite the LEDs 1151. The array 1152 of photosensors 1153 is mounted on a PCB backboard and has a collimator 1154 arranged between it and the conveyor. The collimator 1154 is a block (typically of metal or plastic, but other opaque materials can be used) which has a plurality of holes 1155 drilled through it, each hole directly corresponding to one of the photosensors 1153 and arranged to only permit light travelling directly along the axis of the hole 1155 to arrive at the corresponding photosensor. For ease of manufacture, the holes 1155 may have a wider bore for the majority of their length, with a small aperture on the face of the collimator 1154 facing the LED plate 1151.

The array 1152 (and the holes 1155 in the collimator) may be one-dimensional (vertically only) or may be a two-dimensional grid (vertically and, not shown, along the translational axis of the conveyor 1102).

When a product 1200 is between the LED plate 1151 and the array 1152, the silhouette of the product 1200 can be determined from the outputs of the photosensors 1153 as only photosensors whose "view" of the product 1200 as defined by the corresponding hole 1155 in the collimator 1154 will receive illumination from the LED plate 1151. Thus the sensor 1150*a* can determine the height, in the case of either array, and length, in the case of the two-dimensional array, of an irregular product 1200 such as a meat cut (e.g. chicken breast). This can be determined by finding the edges of the product in the array (i.e. where one photosensor is illuminated, but it neighbour is not). This height (and, where applicable, length) can then be used in determining how to position the arm 1121 and probe 1120 in order to obtain an accurate temperature reading of the product 1200.

FIG. 25 shows a second such sensor 1150*b*, which operates on a broadly similar principle to the first sensor 1150*a* described above. Similar components will be given similar reference numerals between the two Figures. In the sensor 1150*b* shown in FIG. 25, the array 1152 is positioned vertically above the conveyor 1102. LED illuminator plates 1151 are positioned obliquely either side of the conveyor and above it.

In this sensor, the product 1200 is illuminated from above by the LED plates 1151. The surface of the conveyor 1102 is chosen to be non-reflective or dark. The photosensors 1153 in the array 1152 therefore sense reflection from the product 1200 but not from the regions of the conveyor 1102 where there is no product. This provides an image of the product and allows the length and width of the product 1200 to be determined (again based on the "edges" between an illuminated photosensor and a neighbour which is not illuminated).

FIG. 26 shows a third such sensor 1150*c*, which operates on different principles to the first and second sensor described above. The third sensor 1150*c* is a "comb" arrangement which comprises a plurality of spring-loaded probes 1161 which project downwards from a guide block 1162 which has a plurality of corresponding guides, one for each probe. The spring-loading biases the probes 1161 in a downwards direction. Each probe 1161 has a vertical position sensor (not shown) associated with it inside the guide block 1162 which is arranged to measure the vertical position of the probe.

The sensor 1150c is positioned vertically above the conveyor on which the products are proceeding to the measurement apparatus. When the product is stationary, the comb descends (by operation of actuators which cause the guide block 1162 to move, for example by mounting the sensor 1150c on a robot arm) onto the product. As the probes 1161 come into contact with the product, they are displaced upwards (the force causing the guide block to descend exceeds the spring force of the biasing of the individual probes). When it is determined that the tips of the probes not in contact with the product have reached the level of the conveyor (a position which will be known and repeatable), the height of any displaced probes can be sensed and the profile (and in particular the maximum height and the relative position of the point of maximum height) of the product determined. In a simple arrangement, the sensor 1150c may only measure the maximum height of the product by determining the probe 1161 which has been furthest displaced.

The sensor 1150c can be repositioned and re-lowered to sense the profile of the product in a number of different positions. In alternative embodiments, the sensor 1150c can consist of a two-dimensional array of probes 1161 which allows a three-dimensional profile and position of the product to be determined in a single descent of the sensor.

Figure 27:
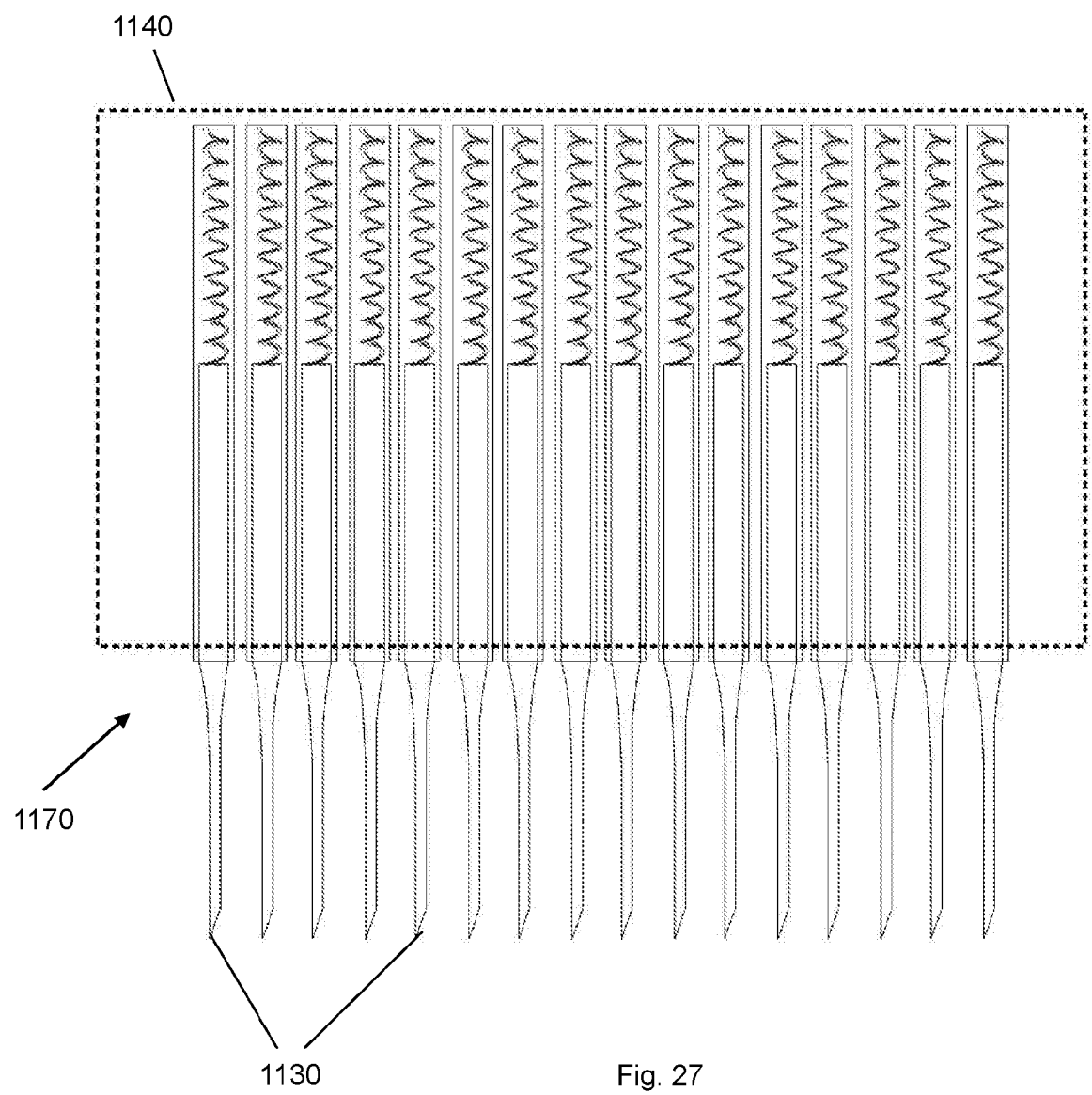
FIG. 27 shows an array of temperature probes which are used in a temperature measurement apparatus according to an embodiment of the present invention.
Figure 28:
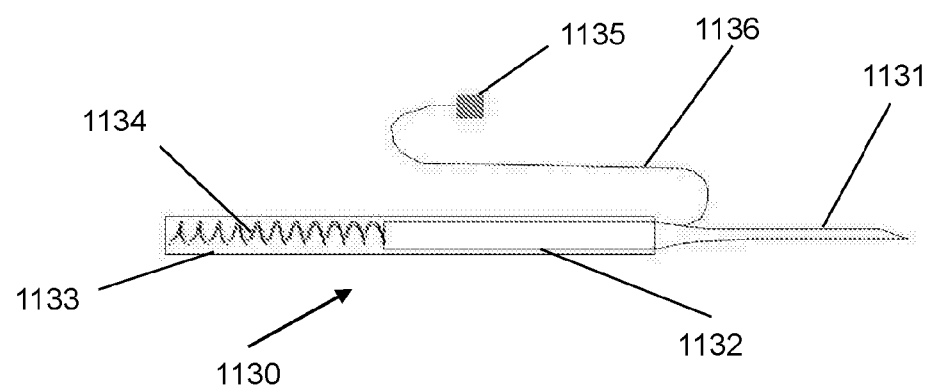
FIG. 28 shows the details of one of the temperature probes of FIG. 27.

In a further embodiment, as illustrated in FIGS. 27-29, a different sensor "head" 1170 is provided on the measurement apparatus 1100, for example, on the end of the arm 1121 of the apparatus.

As shown in FIG. 27, the sensor head 1170 of this embodiment comprises an array of temperature probes 1130 mounted in a housing 1140. Although FIG. 27 shows a one-dimensional array, the sensor head 1170 of this embodiment preferably is a two-dimensional array of temperature probes 1130. FIG. 28 shows the details of a single one of the temperature probes 1130 (for clarity, the details are omitted from FIG. 27). In the embodiment shown, the sensor head 1170 has an array of 8 by 8 probes, but other configurations can of course be adopted depending on the dimensions of the probes and the precision of the measurement readings desired.

As shown in FIG. 28, the temperature probes 1130 have a hypodermic-style thermocouple probe 1131 at their distal end, connected to a body 1132. The body is arranged to move smoothly in a cavity 1131 which is snug-fitted to avoid jitter or jamming, whilst still allowing movement of the body. In alternative embodiments, the cavity may have slots or sliders on the inside to guide the movement of the body.

A spring 1134 biases the body outwards from the cavity. The spring 1134 ensures that the thermocouple probe 1131 is able to penetrate a product on the conveyor, but if it encounters a solid object (such as a bone within a meat product), it is able to retract whilst the sensor head 1170 continues to be pressed down onto the product (so that other probes in the array can penetrate further into the product, if appropriate).

A sensor cable 1136 runs from the thermocouple to a connector 1135. The connectors in the sensor head 1170 will be mounted on a PCB where amplification and cold-junction compensation is performed to deliver a linear voltage readout from each probe. These outputs are then interfaced by a multichannel ADC to the system processor.

In operation, a product is diverted from the main conveyor (as described in more detail in the above embodiments) and stopped on the side conveyor. The arm 1121 then lowers the sensor head 1170 so that the probes 1130 engage with the product and are inserted into the product. The arm continues to lower the sensor head 1170 to a predetermined vertical position. Any probes that encounter a hard or solid portion of the product will retract into their cavity, whilst those which encounter softer portions (or do not encounter the product at all) will remain extended. The penetrating pressure of the probes is determined by the springs 1134 and the dimension of the tip of the thermocouple probe 1131.

Once the sensor head has reached the predetermined vertical position, parallel temperature readings are taken from each thermocouple probe. Some of the probes will measure the "open air" temperature as they will not contact the product, whilst some of the probes will only partially insert into the product (for example because of the positioning of the product or because they cannot penetrate far into the product in their position).

FIG. 29 shows, schematically, examples of the use of sensor head 1170 to measure the temperature of a food product 1200 such as a chicken drumstick in two different orientations. FIGS. 29a and 29c show, from above, the array of probes 1130 and their relationship to the product. From these, it can be seen that the majority of the probes do not engage with the product at all, whilst some probes engage with the edges of the product or smaller parts of the product. However, at least one probes in each case engages with the centre of the main part of the product.

FIGS. 29b and 29d show, respectively, the temperature readings from each of the probes in FIGS. 29a and 29c. It can be seen that the readings from most of the probes in the open air is a consistent 24 degrees Centigrade, whilst those probes in the product read from between 33-62 degrees. (It will also be noted that some of the probes which do not actually engage with the product, but which are very close to the exterior of the product read a slightly elevated "open air" temperature due to that proximity.)

The processor of the measurement apparatus reads out and logs all of the temperatures from the probes (64 in this case). Those representing "open air" temperatures can be quickly discarded by imposing a threshold which can be determined based on the food product and the type of thermal processing it has been subjected to (the threshold will be a lower limit for a heated product and an upper limit for a chilled or frozen product). The central reading or cluster of readings can then be determined and extracted and processed to report an average central temperature or a peak temperature. Alternatively or additionally a thermal profile of the product could be obtained which may indicate the consistency of cooking, which may be of use to the operator.

FIG. 29 demonstrates that, for the sensor head 1170 of this embodiment, the size, positioning and orientation of the product 1200 is unimportant, except that the product if preferably smaller than the array of probes 1130. This means that the apparatus as a whole can be simplified by removing/reducing the need for guides or pusher arms or other arrangements to accurately position the product 1200 for measurement.

Further, the sensor head 1170 allows a quick read of the temperature of the product 1200, and so can obtain an accurate reading within seconds of the product leaving a thermal processing unit such as an oven or a chiller, particularly because no repositioning is required. This can significantly improve the accuracy of the temperature reading obtained without needing to model the thermal performance of the product.

The probes 1130 may also be maintained in the product for a determined period of time in order to see the evolution of the thermal profile which may be recorded or monitored by the processor. Recording the evolution of the thermal profile can allow further modelling of the evolution of the temperature in future products. Monitoring the evolution of the thermal profile can allow judgements to be made on the cook quality of the product (for example whether all parts of the product reach a desired minimum temperature). The system may employ a pattern-finding routine to determine the shape and/or orientation of the product, and this could allow only date from relevant probes to be considered after the initial readings.

General Provisions

The control of the apparatuses and methods of the above described embodiments may be implemented in whole or in part in a computer system (in particular in computer hardware or in computer software) in addition to the structural components and interactions described.

The term "computer system" includes the hardware, software and data storage devices for embodying a system or carrying out a method according to the above described embodiments. For example, a computer system may comprise a central processing unit (CPU), input means, output means and data storage. Preferably the computer system has a monitor to provide a visual output display. The data storage may comprise RAM, disk drives or other computer readable media. The computer system may include a plurality of computing devices connected by a network and able to communicate with each other over that network.

The methods of the above embodiments may be provided as computer programs or as computer program products or computer readable media carrying a computer program which is arranged, when run on a computer, to perform the method(s) described above, in particular by controlling the various components of the production line and the temperature measurement apparatus.

The term "computer readable media" includes, without limitation, any non-transitory medium or media which can be read and accessed directly by a computer or computer system. The media can include, but are not limited to, magnetic storage media such as floppy discs, hard disc storage media and magnetic tape; optical storage media such as optical discs or CD-ROMs; electrical storage media such as memory, including RAM, ROM and flash memory; and hybrids and combinations of the above such as magnetic/optical storage media.

While the invention has been described in conjunction with the exemplary embodiments described above, many equivalent modifications and variations will be apparent to those skilled in the art when given this disclosure. Accordingly, the exemplary embodiments of the invention set forth above are considered to be illustrative and not limiting. Various changes to the described embodiments may be made without departing from the spirit and scope of the invention.

All references referred to above are hereby incorporated by reference.

The invention claimed is:

1. An apparatus for measuring the temperature of an object, the apparatus including:
    a conveyance system;
    a temperature measurement unit having:
        a controller and at least one arm whose motion is controlled by the controller; and
        a probe attached to said arm and having a temperature sensor, and
    a scanner which obtains information through a barcode on the object;
    wherein the conveyance system is arranged to convey the object to a measurement position proximate said arm;
    wherein the controller is arranged to automatically control motion of the arm so as to cause the probe to penetrate the object to a predetermined depth in the object, such that a temperature measurement of the object can be taken from the temperature sensor;
    wherein the predetermined depth of the probe in the object is based on stored information about the object, the stored information retrieved from memory; and
    wherein the predetermined depth is based on information obtained through the barcode on the object.

2. An apparatus according to claim 1 further including a position sensor which provides information on the position of the temperature sensor to the controller relative to the object.

3. An apparatus according to claim 1 wherein the controller acquires information about the object and the predetermined depth is calculated so as to cause the temperature sensor to be positioned approximately in the geometric center of the object.

4. An apparatus according to claim 1 wherein the controller controls the motion of the arm so as to cause the probe to remain in a constant position in the object until a stabilized temperature measurement is made.

5. An apparatus according to claim 1 further including guide elements arranged on the conveyance to cause the object to arrive at the measurement position and/or to stop the object at the measurement position.

6. A method of measuring the temperature of an object, on a conveyance system, the method including the steps of:
    obtaining information about the object through a barcode located on the object;
    locating the object on the conveyance system;
    conveying the object to a measurement position using the conveyance system;
    when the object arrives at the measurement position, automatically causing a probe having a temperature sensor to penetrate the object and taking a temperature measurement of the object using the temperature sensor
    wherein the temperature sensor penetrates the object to a position that is based on stored information about the object, the stored information retrieved from memory; and
    wherein the position of the temperature sensor is based on information obtained through the barcode on the object.

7. A method according to claim 6 wherein the step of penetrating causes the probe to penetrate the object to a predetermined depth.

8. A method according to claim 7 further including the step of determining the position of the temperature sensor during the step of penetrating.

9. A method according to claim 6 further including the step of:
    determining the predetermined depth from said information such that the predetermined depth causes the temperature sensor to be positioned approximate in the geometric center of the object or a part of the object.

10. A method according to claim 6 wherein the temperature measurement is monitored whilst the probe is in the object and the probe is withdrawn from the object when a stabilized temperature measurement has been taken.

11. A method according to claim 10 further including the step of:
   determining from that information, the minimum time for which a stabilized temperature measurement is required.

\* \* \* \* \*